J. R. PEIRCE.
RECORDING APPARATUS AND DEVICE.
APPLICATION FILED APR. 18, 1908.

1,219,765.

Patented Mar. 20, 1917.
16 SHEETS—SHEET 1.

WITNESSES:
Fred White
René Buine

INVENTOR:
John Royden Peirce,
By Attorneys
Arthur E. Fraser

J. R. PEIRCE.
RECORDING APPARATUS AND DEVICE.
APPLICATION FILED APR. 18, 1908.
1,219,765.
Patented Mar. 20, 1917.
16 SHEETS—SHEET 2.
FIG. 2.ª
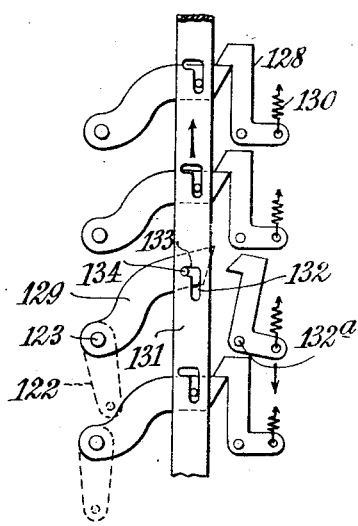
FIG. 2.
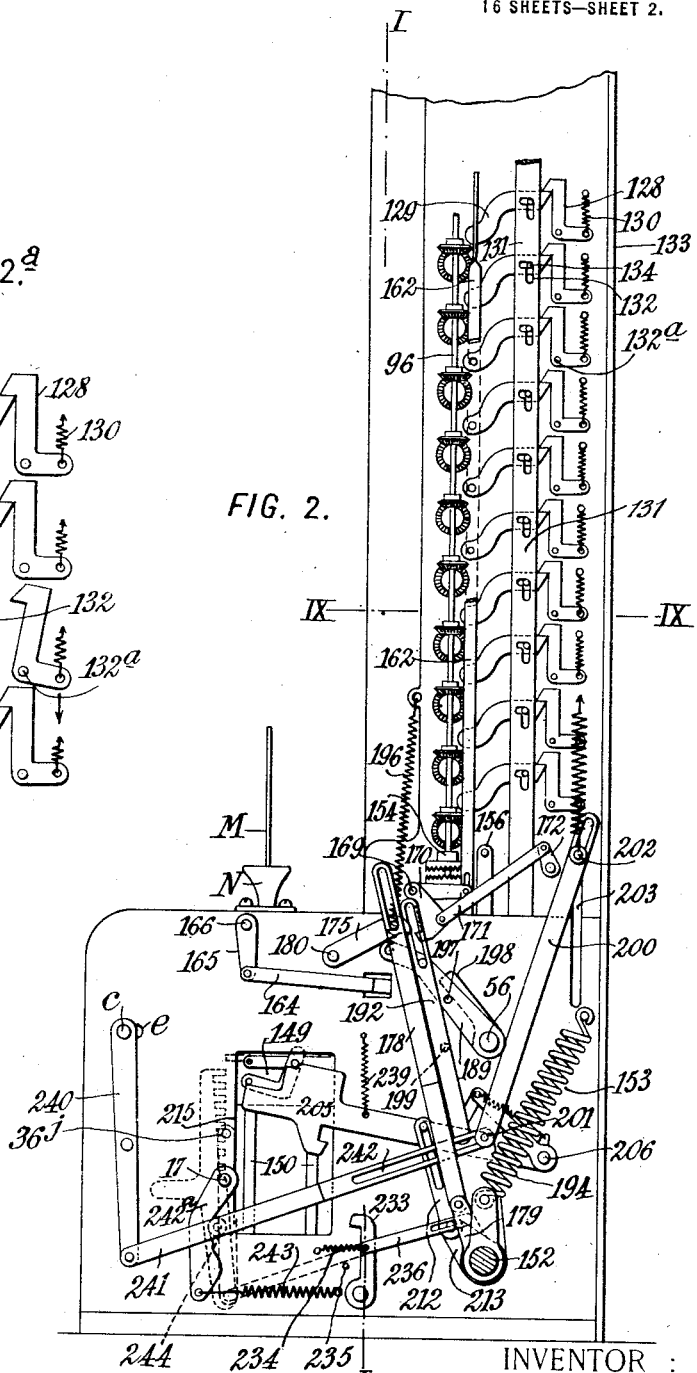
WITNESSES:
INVENTOR:
John Royden Peirce,
By Attorneys,

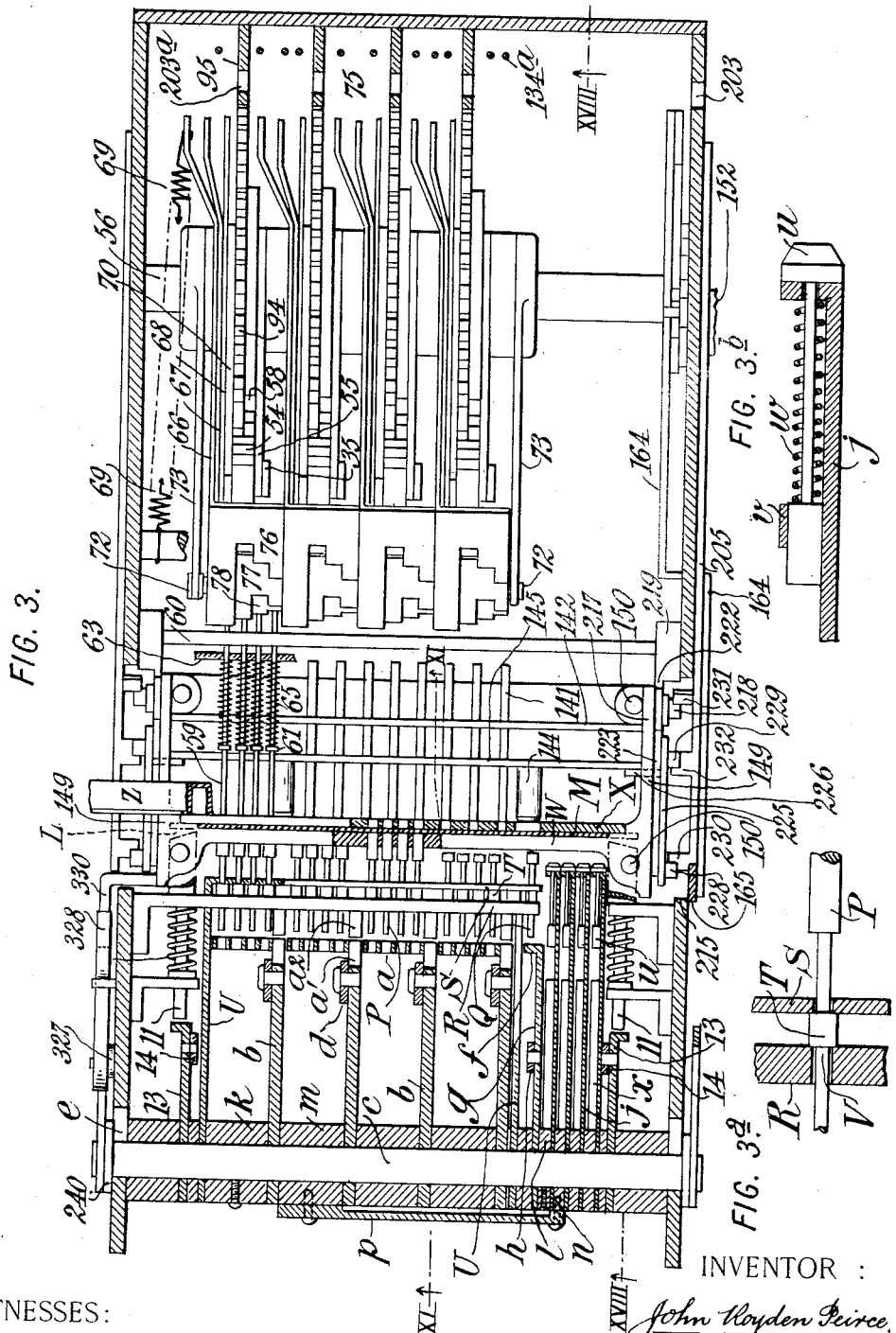

J. R. PEIRCE.
RECORDING APPARATUS AND DEVICE.
APPLICATION FILED APR. 18, 1908.

1,219,765.

Patented Mar. 20, 1917.
16 SHEETS—SHEET 4.

WITNESSES:
Fred White
René P Muine

INVENTOR
John Royden Peirce,
By Attorneys,
Arthur C. Fraser & Usina

J. R. PEIRCE.
RECORDING APPARATUS AND DEVICE.
APPLICATION FILED APR. 18, 1908.
1,219,765.
Patented Mar. 20, 1917.
16 SHEETS—SHEET 5.
FIG. 5.
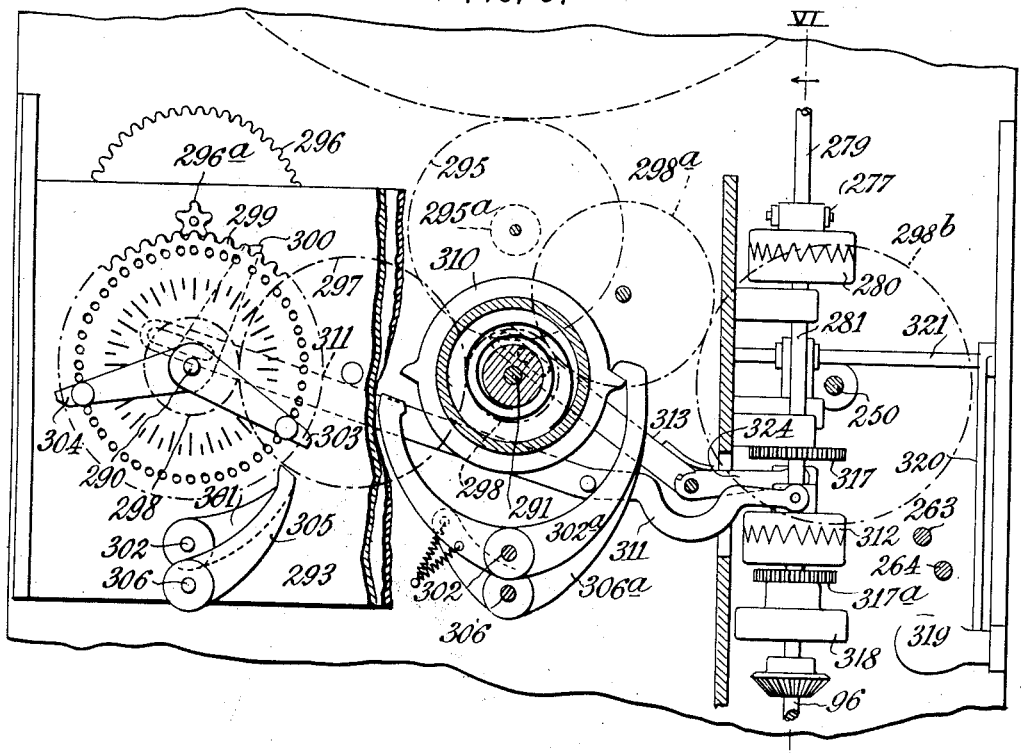
FIG. 6.
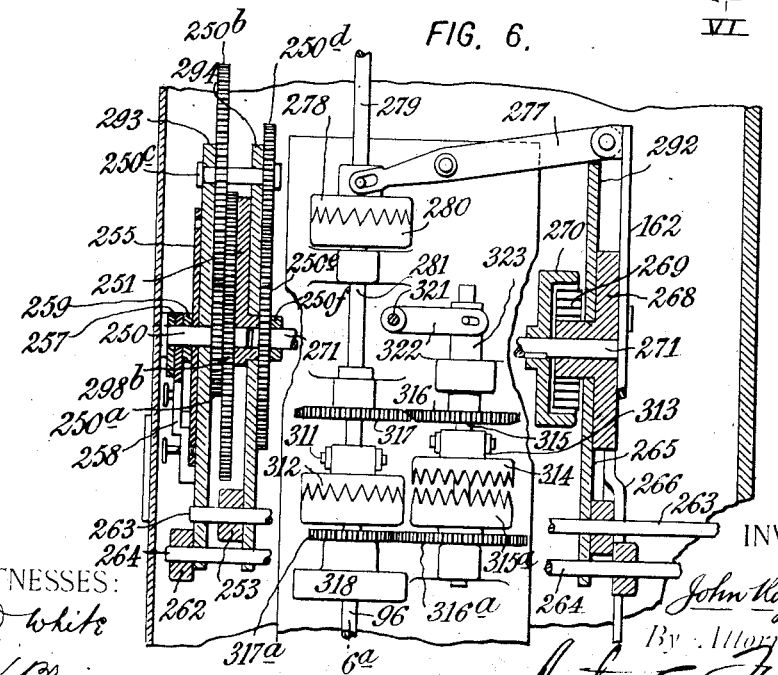
FIG. 6.ª
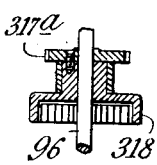
WITNESSES:
Fred White
René Paine
INVENTOR:
John Hoyden Peirce,
By his Attorneys.

J. R. PEIRCE.
RECORDING APPARATUS AND DEVICE.
APPLICATION FILED APR. 18, 1908.

1,219,765.

Patented Mar. 20, 1917.
16 SHEETS—SHEET 6.

WITNESSES:

INVENTOR:
John Royden Peirce,
By Attorneys

J. R. PEIRCE.
RECORDING APPARATUS AND DEVICE.
APPLICATION FILED APR. 18, 1908.

1,219,765.

Patented Mar. 20, 1917.
16 SHEETS—SHEET 7.

FIG. 11ᵃ.

WITNESSES:
Fred White
René Bruine

INVENTOR:
John Royden Peirce,
By Attorneys
Arthur C. Fraser & Usina

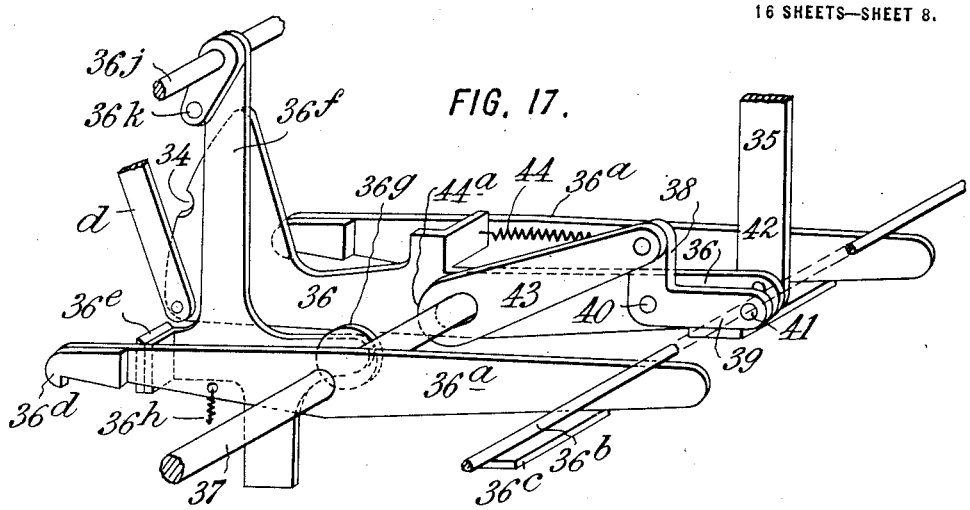
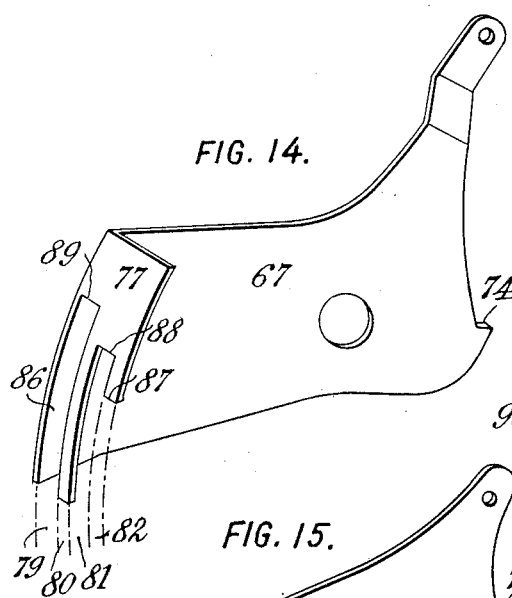
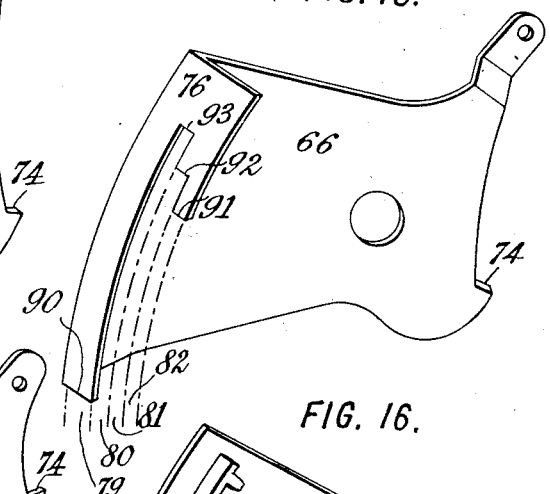
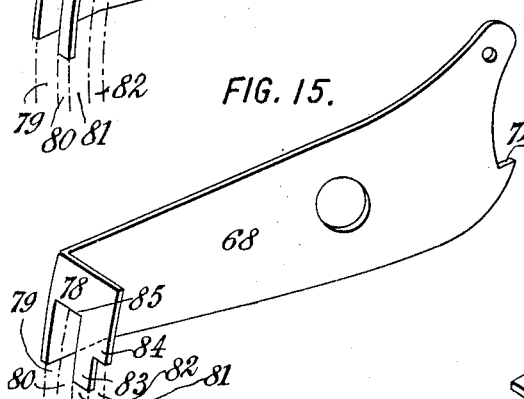
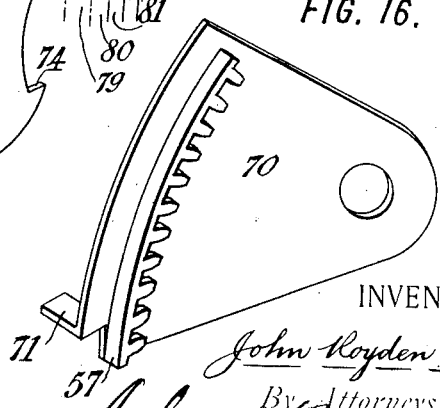

J. R. PEIRCE.
RECORDING APPARATUS AND DEVICE.
APPLICATION FILED APR. 18, 1908.

1,219,765.

Patented Mar. 20, 1917.
16 SHEETS—SHEET 9.

WITNESSES:
Fred White
Rene Muine

INVENTOR:
John Hoyden Peirce,
By Attorneys,

J. R. PEIRCE.
RECORDING APPARATUS AND DEVICE.
APPLICATION FILED APR. 18, 1908.
1,219,765.
Patented Mar. 20, 1917.
16 SHEETS—SHEET 10.
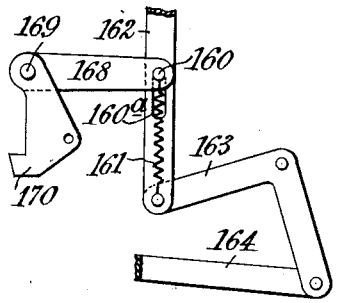
FIG. 21ª
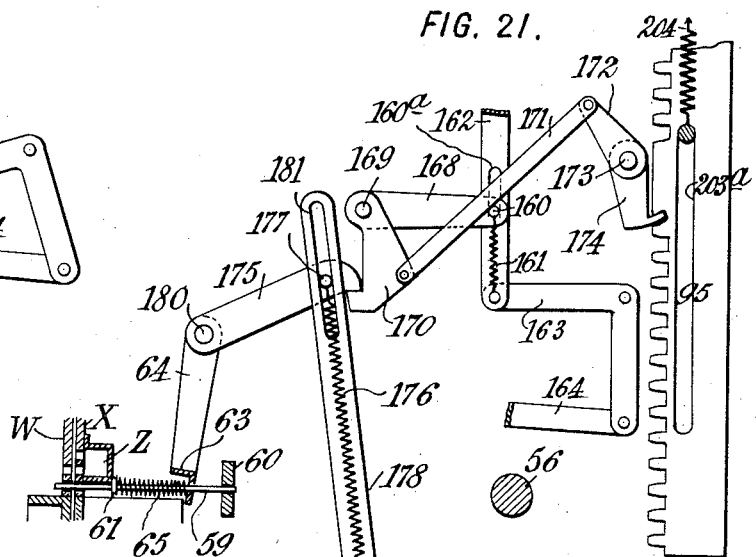
FIG. 21.
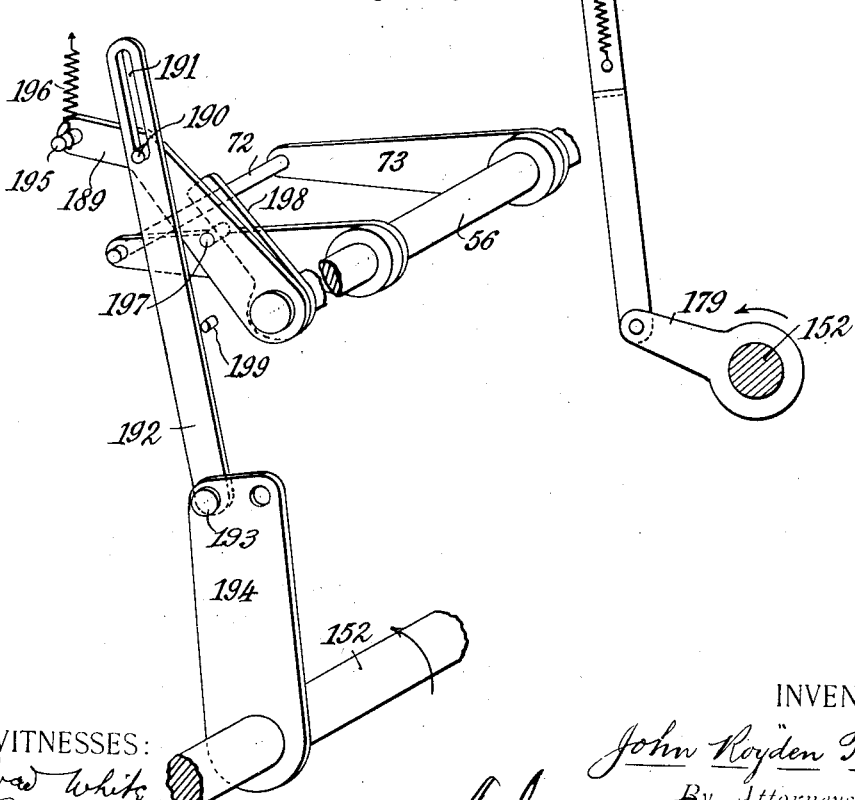
FIG. 20.
WITNESSES:
INVENTOR:
John Royden Peirce,
By Attorneys,

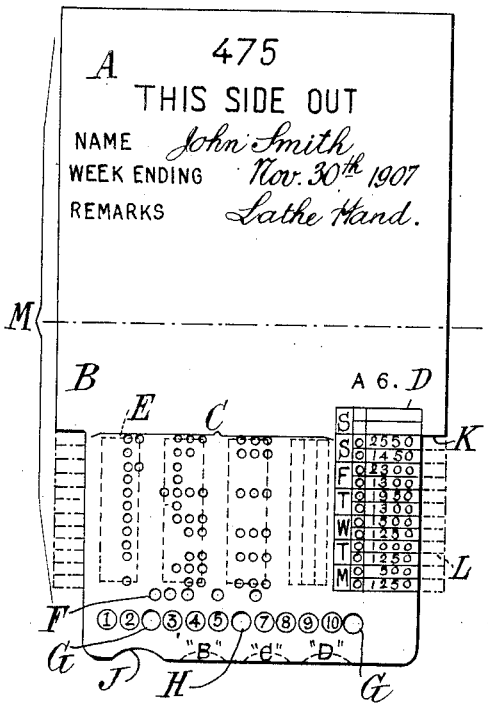
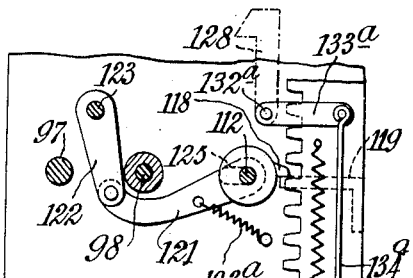
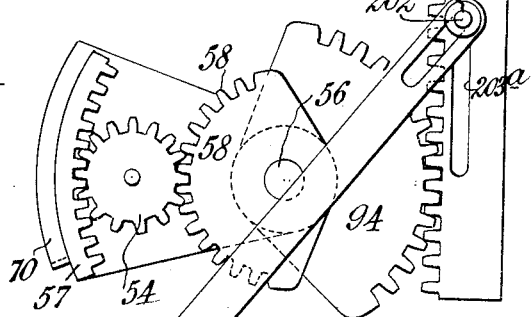
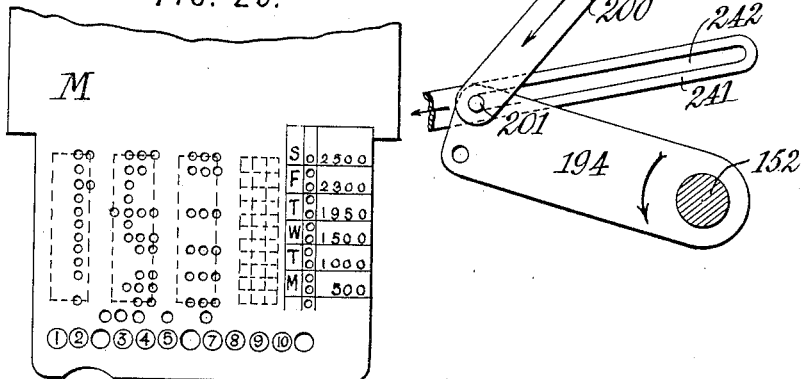
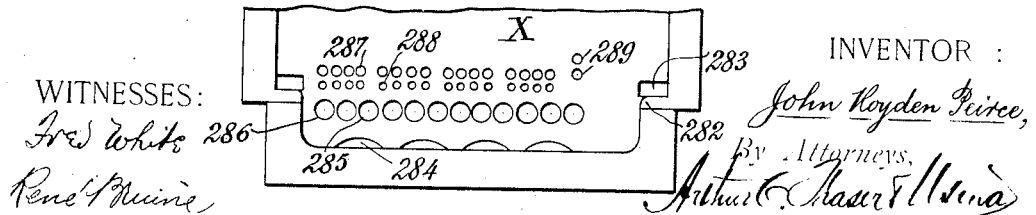

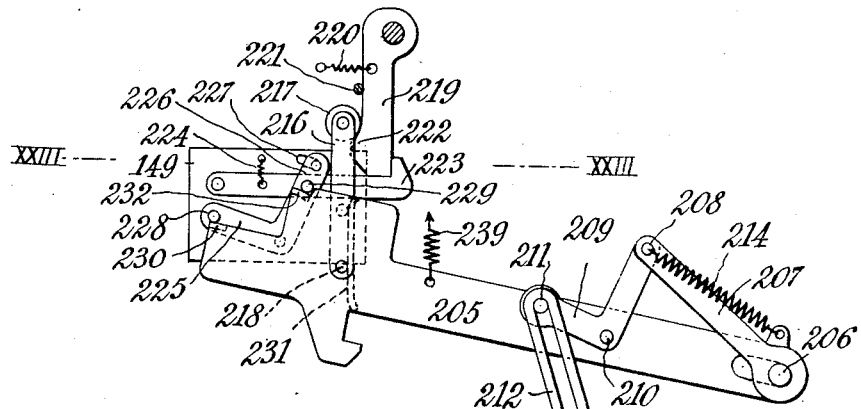
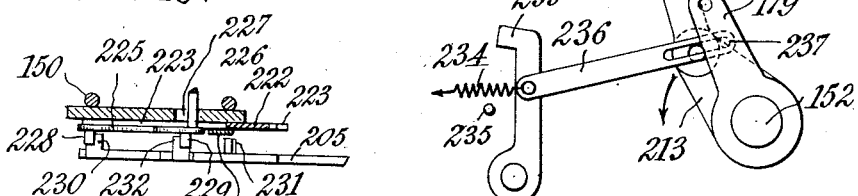
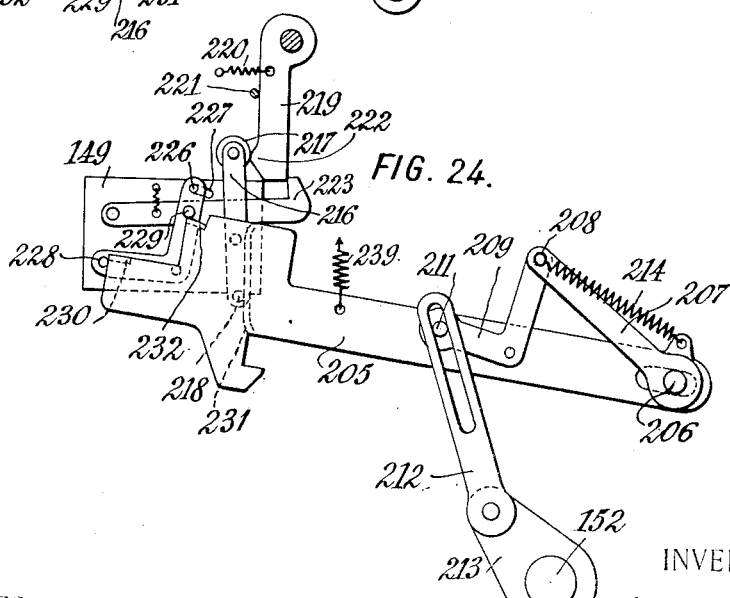

J. R. PEIRCE.
RECORDING APPARATUS AND DEVICE.
APPLICATION FILED APR. 18, 1908.

1,219,765.

Patented Mar. 20, 1917.
16 SHEETS—SHEET 13.

WITNESSES:

INVENTOR :
John Royden Peirce,
By Attorneys

J. R. PEIRCE.
RECORDING APPARATUS AND DEVICE.
APPLICATION FILED APR. 18, 1908.

1,219,765.

Patented Mar. 20, 1917.
16 SHEETS—SHEET 14.

WITNESSES:
Fred White
René Bruine

INVENTOR:
John Royden Peirce,
By Attorneys,
Arthur C. Fraser & Usina

J. R. PEIRCE.
RECORDING APPARATUS AND DEVICE.
APPLICATION FILED APR. 18, 1908.
1,219,765.
Patented Mar. 20, 1917.
16 SHEETS—SHEET 15.
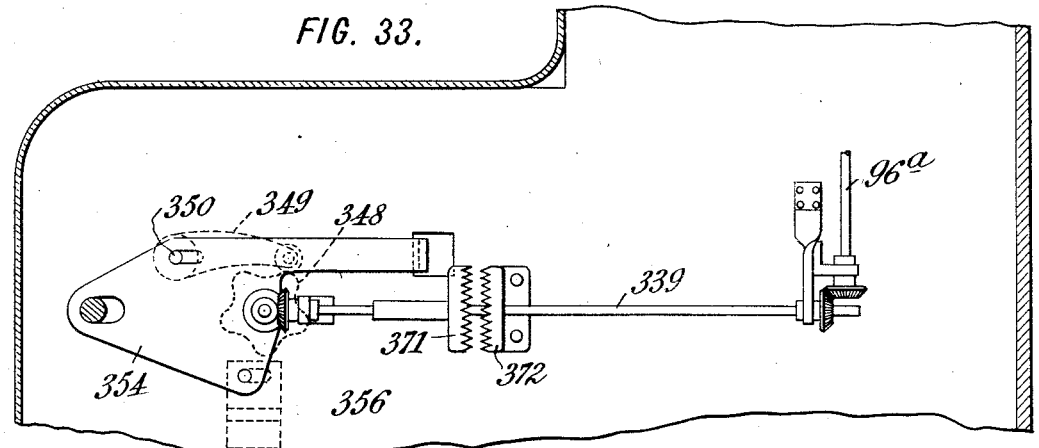
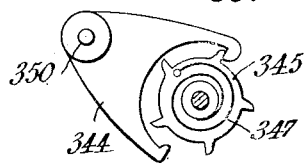
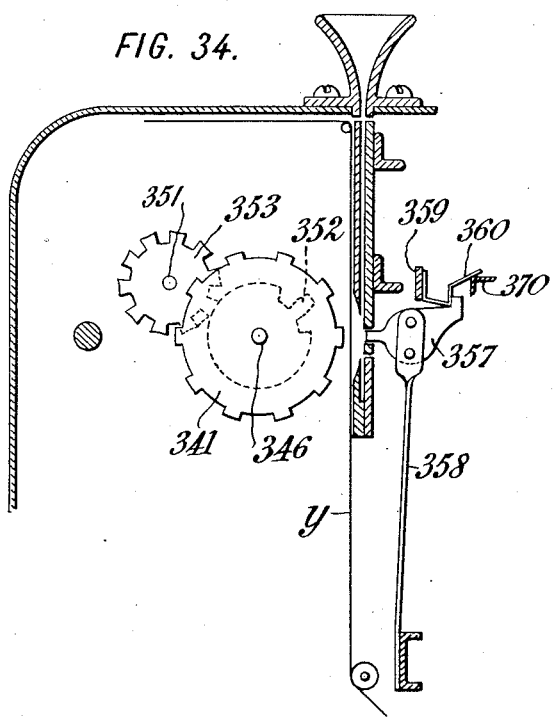
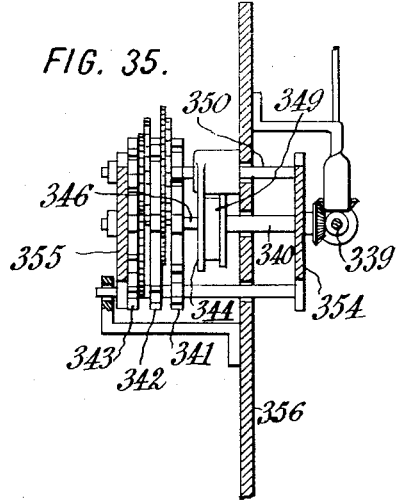
WITNESSES:
INVENTOR:
John Royden Peirce,
By Attorneys.

J. R. PEIRCE.
RECORDING APPARATUS AND DEVICE.
APPLICATION FILED APR. 18, 1908.

1,219,765.

Patented Mar. 20, 1917.
16 SHEETS—SHEET 16.

WITNESSES:

INVENTOR:
John Royden Peirce,
By Attorneys

UNITED STATES PATENT OFFICE.

JOHN ROYDEN PEIRCE, OF NEW YORK, N. Y.

RECORDING APPARATUS AND DEVICE.

1,219,765.  Specification of Letters Patent.  Patented Mar. 20, 1917.

Application filed April 18, 1908. Serial No. 427,859.

*To all whom it may concern:*

Be it known that I, JOHN ROYDEN PEIRCE, a citizen of the United States, residing in the borough of Manhattan, city, county, and State of New York, have invented certain new and useful Improvements in Recording Apparatus and Devices, of which the following is a specification.

The invention provides improvements adapted to be used in a manner which is generally similar to the use of workmen's time-recorders, but which has numerous advantages over such apparatus as previously constructed. The complete apparatus is designed to calculate the wages due to the workmen, and to record the total amount due upon each of the successive days of the week, a single recording apparatus being used to record the wages of all the workmen in a shop or at least of a number of workmen. Preferably the recording of each workman's wages is effected by printing upon a card, and at the same time by making corresponding perforations in the card, so that the card thus perforated may be used to control a bookkeeping machine (analogous, for example, to that of my application for Patent No. 387,868, filed August 9, 1907) by which the amounts may be entered in suitable books and totaled as desired. Numerous other features of advantage of the complete machine, method and card, and of the several sub-combinations, are referred to in detail hereinafter. The accompanying drawings illustrate embodiments of the invention.

Fig. 2 is a side elevation of the lower parts of the machine.

Fig. 2ª is a similar view of part of the apparatus in the position of operation.

Fig. 3 is a horizontal section on several different planes (mainly on the line III—III of Fig. 11) through the lower parts of the machine. Figs. 3ª and 3ᵇ are enlarged details of the mechanism of Fig. 3.

Figure 4:
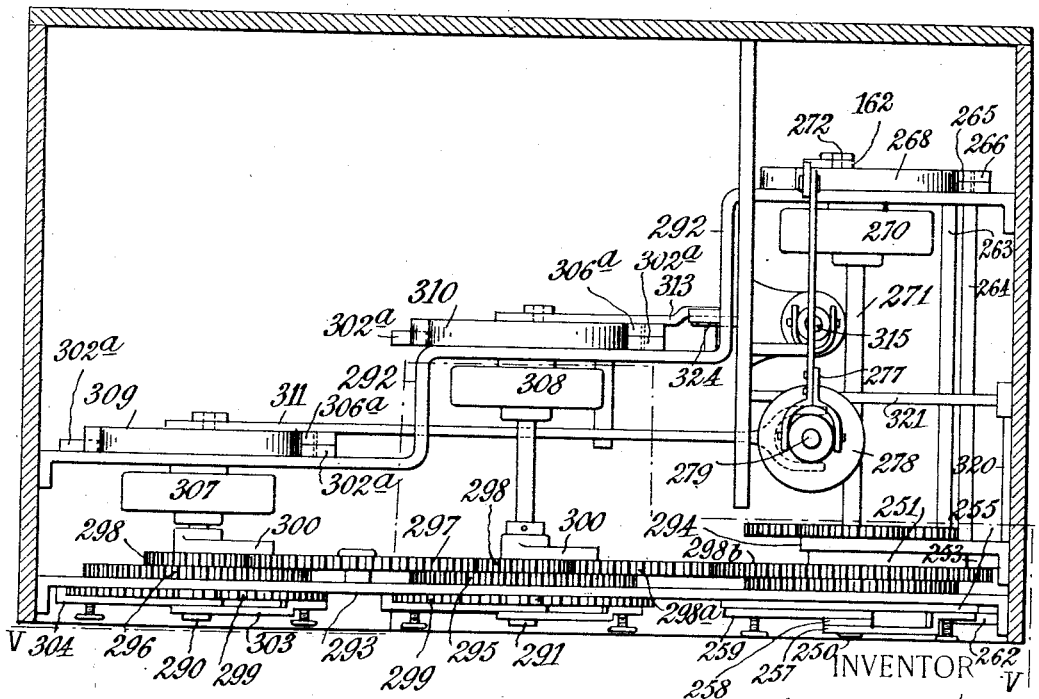

Fig. 4 is a plan of the top of the machine, omitting the clock.

Figure 1:
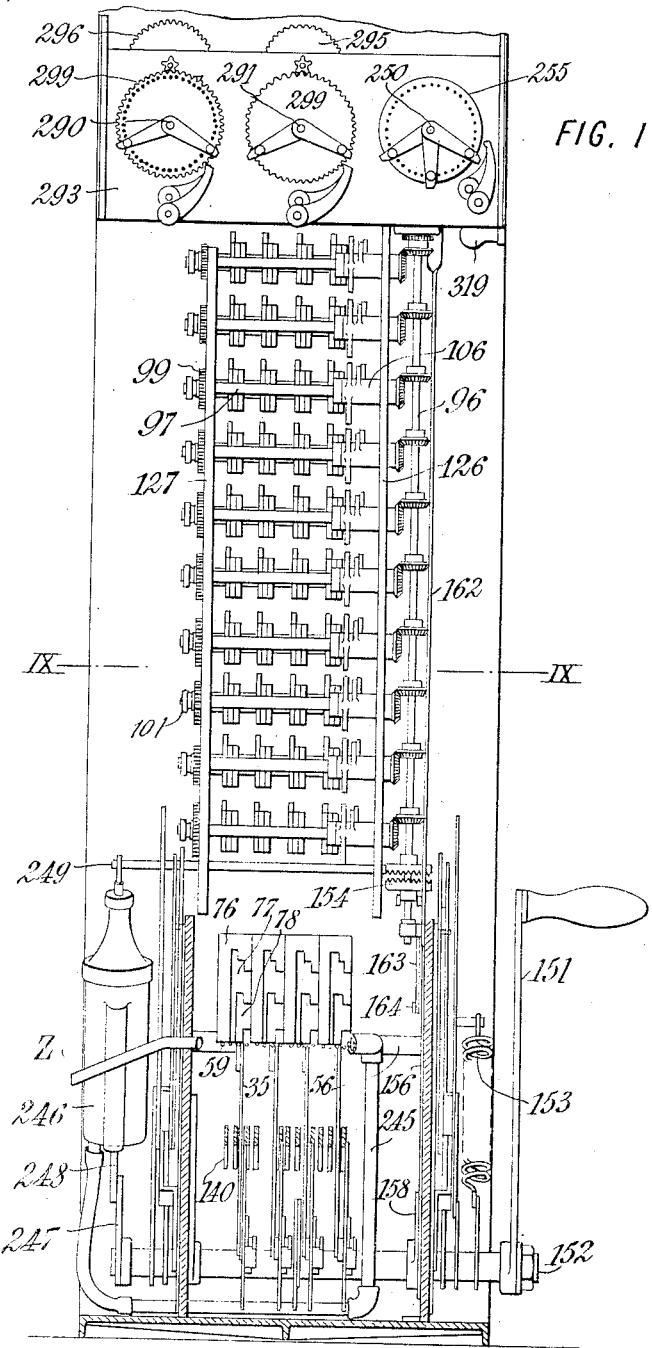
Figure 1 is a vertical section on the line I—I of Fig. 2 showing the principal parts of the calculating mechanism in front elevation.

Fig. 5 is a vertical sectional view of the upper portion of the mechanism taken on planes parallel with Fig. 1, and along the line V—V of Fig. 4.

Fig. 6 is a vertical section of the same mechanism taken on the line VI—VI of Fig. 5.

Fig. 6ª is a sectional detail of Fig. 6.

Figure 7:
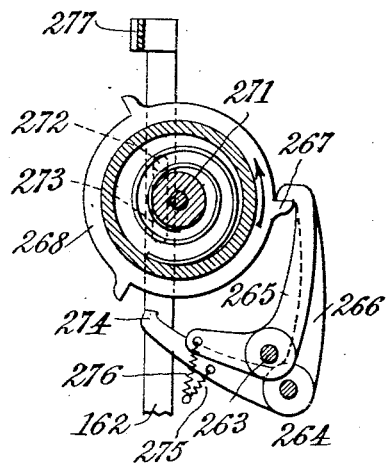
Figure 8:
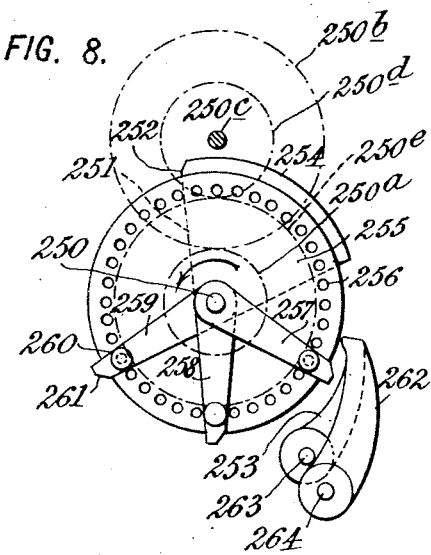

Figs. 7 and 8 are details of the "noon" mechanism.

Figure 9:
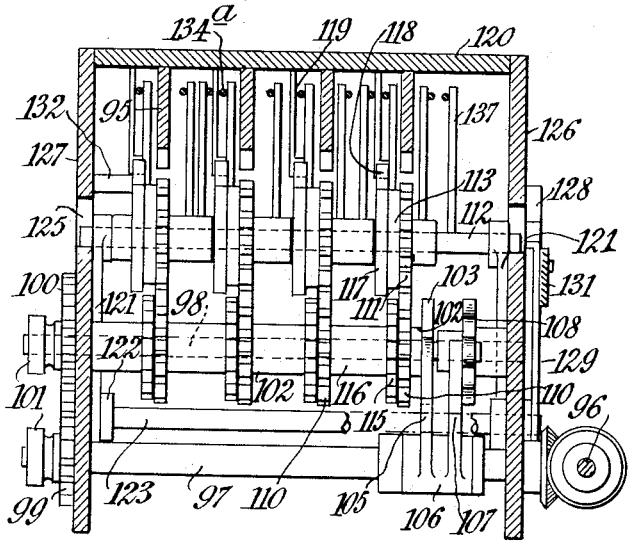

Fig. 9 is a horizontal section (on lines IX—IX of Figs. 1 and 2) of the intermediate part of the machine, showing in plan one complete set of "rate" wheels.

Figure 10:
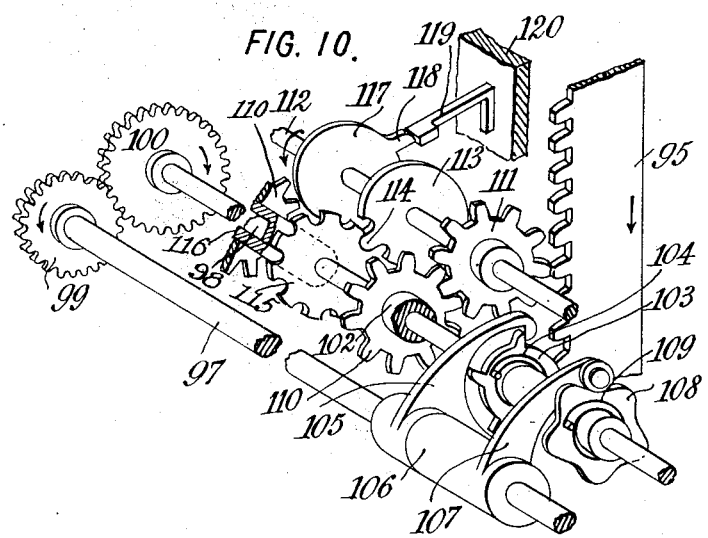

Fig. 10 is a diagrammatic perspective arrangement of a single rack bar and one set of rate wheels coöperating therewith.

Figures 11, 12:
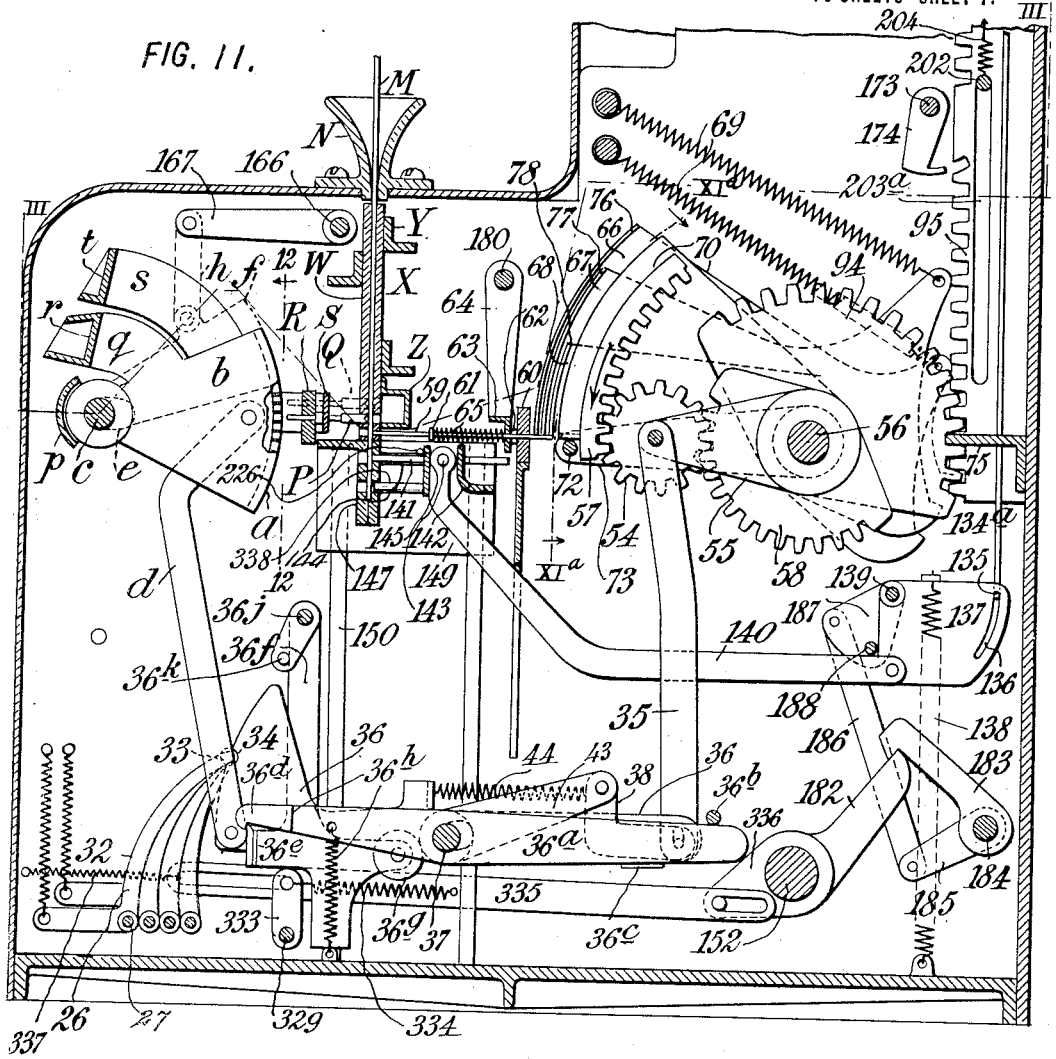

Fig. 11 is a vertical section approximately on the line XI—XI of Fig. 3.

Fig. 11ª is a section of a detail on the line XIª—XIª of Fig. 11.

Fig. 12 is a diagram showing in face elevation the several sectors which operate the punches and types, and all of which are mounted on a common shaft.

Figs. 13, 14, 15 and 16 are perspective views of certain flanged segments hereinafter referred to.

Fig. 17 is a diagrammatic perspective view of the mechanism for transmitting the movements of the said sectors to the recording devices, the levers being separated for the sake of clearness.

Figure 18:
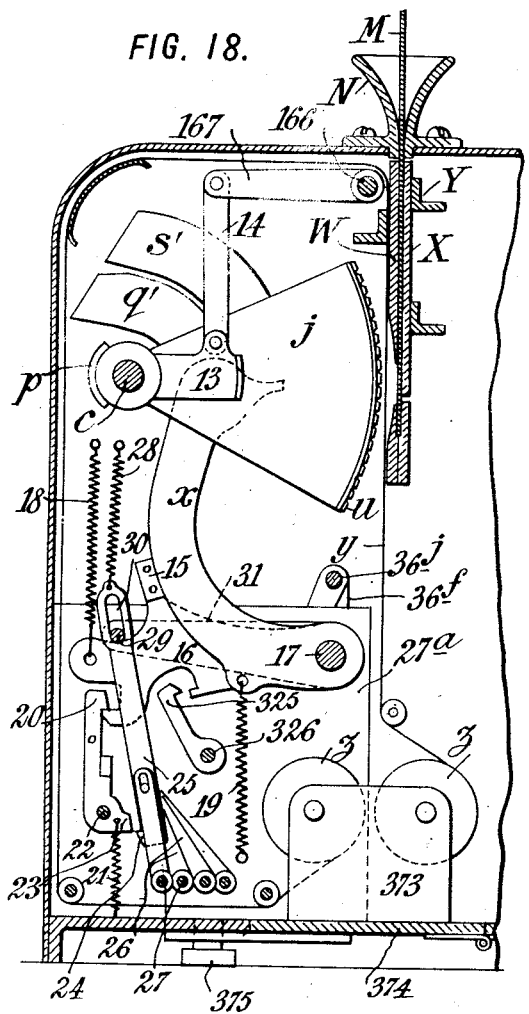

Fig. 18 is a sectional view approximately on the line XVIII—XVIII of Fig. 3.

Figure 19:
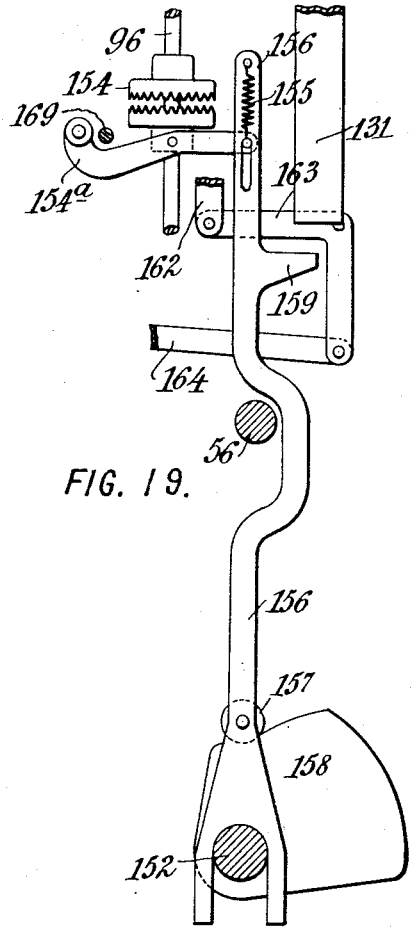

Fig. 19 is a side elevation of mechanism for controlling a clutch which prevents the advance of the computing mechanism while a record is being made.

Fig. 20 is a perspective view of mechanism for effecting the downward movement of the segments.

Fig. 21 is an elevation of the mechanism for effecting the advance of the "minuend" pins. Fig. 21ª is a similar view for another position of the parts.

Fig. 22 is an elevation of the mechanism for bringing down the racks.

Figs. 23, 24, 25 and 26 show in side elevation the mechanism for operating the "sub-pocket".

Fig. 23ª is a horizontal section approximately on the line XXIIIª—XXIIIª of Fig. 23.

Fig. 27 is a face elevation of a card to be used with the machine.

Fig. 28 is a face elevation of the pocket of the machine, showing the positions of the several apertures for the punching pins, subtrahend pins, rate pins, setting pins, shoulder punches, and the like.

Fig. 29 is a face view of a modified style of card.

Figure 30:
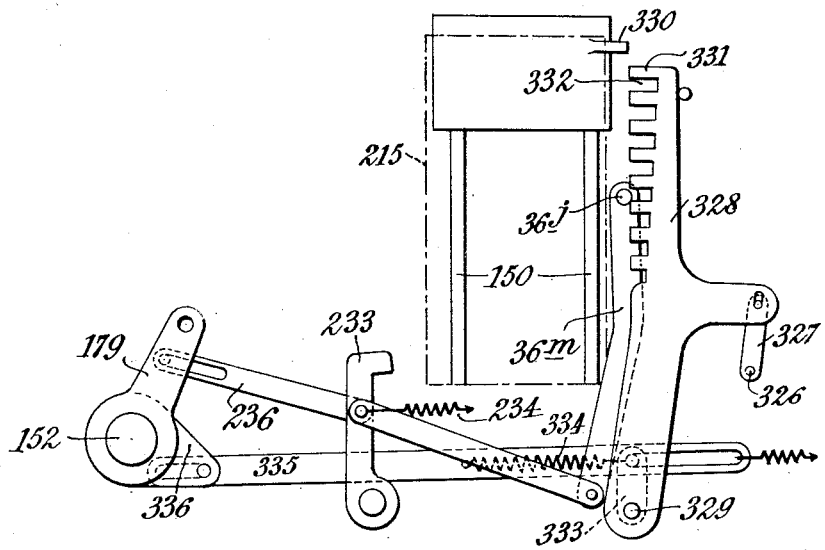

Fig. 30 is an elevation of a mechanism at the left-hand side of the machine for preventing the printing of certain subtrahend numbers upon a card, that is to say, for printing the card of Fig. 29.

Figure 31:
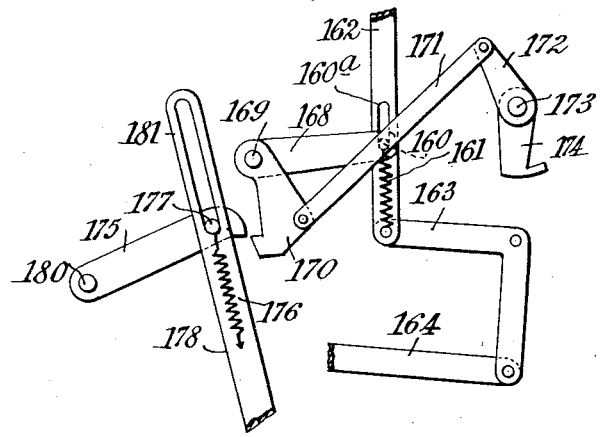

Fig. 31 is a perspective view of the locking mechanism unlocked by the lifting of the noon bar.

Figure 32:
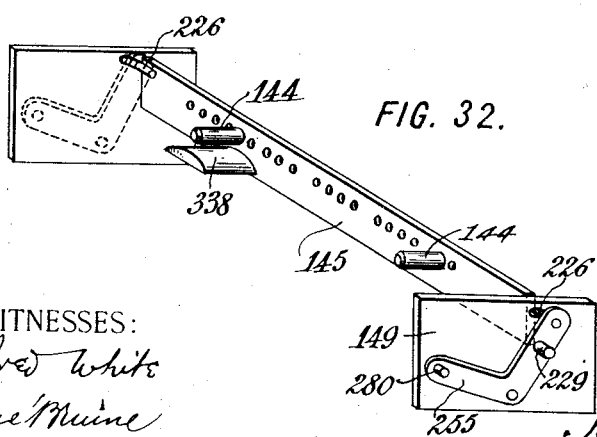

Fig. 32 is a perspective of the plate carrying the card setting and rate selecting punches or members.

Figs. 33, 34 and 35 are respectively a side elevation, a transverse section, and a front elevation of a mechanism for printing hours and minutes instead of dollars and cents.

Fig. 33a is a detail thereof.

Figures 36, 37:
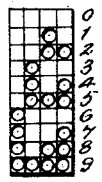

Fig. 36 is an elevation of another card.

Fig. 37 is a table of perforation groups.

Referring first to the card shown in Fig. 27, this contains an elongated upper part A serving as a handle by which the workman thrusts the card down into the slot of the machine, and the lower part B (divided by an imaginary line from the upper part) upon which the record is made. The upper part of the card may contain any permanent matter. For example, "475" is the workman's number; "This side out" is simply a matter of direction; and the name, date, and occupation may be written in by the time-keeper. The designation "A 6" means that the card belongs to clock "A" and rate No. 6. The lower part of the card contains at the left a space C, preferably unruled, and at the right a space D preferably ruled, and arranged with a column at the left containing the initials of the days of the week, an intermediate column containing two spaces (one above the other) opposite each day of the week for indicating the noon recess taken by the workmen, and the column at the right for indicating in alternate lines the wages due at the end of each day and certain numbers used by the machine in its calculations. The space C at the left of the lower part of the card is divided preferably by imaginary lines into a number of spaces E corresponding to the greatest number of digits to be indicated on the machine, four in the present case. Each of these spaces is divided (preferably also by imaginary lines) into vertical columns and horizontal lines. By the perforating of proper points in the spaces E, certain numbers are indicated according to a determined system. Various systems are possible. For compactness on the card and simplicity of the machine I prefer a system which provides in each of the horizontal lines four points to be perforated, and which determines the figure to be expressed by combinations of these four points. Thus there may be used to express any desired figure either one perforation in any one of four points, or a combination of one or more perforations in the same line. By such a system it is possible with four points in a line to express any desired figure from 0 to 9.

The groupings of the perforations to indicate the successive figures may be selected arbitrarily, but I prefer a regular system of grouping the perforations to indicate the successive figures from 0 to 9, since such regularity simplifies the construction of the machine, as will be shown hereinafter. A suitable system is indicated upon the face of the segment $a$ of Fig. 12 (being duplicated on this segment on each side of 0 for a purpose hereinafter explained). Figures corresponding to the numbers represented by the several horizontal series of perforations are located on a segment $j$ at the left. This Fig. 12 is a sort of negative of the system. The segments shown in this figure coöperate with a series of punches P (Figs. 3 and 3a) and are moved forward against the tails of the punches. The unperforated portions of the segments operate upon the oppositely situated punches to press them forward for the perforating operation, while those punches opposite the perforated portions of the segment will telescope the tail of the segment and fail to press them forward to perform the perforating operation. The holes indicated in the plate have the effect, therefore, upon operation of the machine, in failing to cause the corresponding punches to perforate corresponding points upon the card; and the unperforated points on the plate result in causing their corresponding punches to make perforations at corresponding points of the card. From this the following table (illustrated in Fig. 37) is deduced:—

No punches indicate_____ 0
A punch in the third space indicates_____ 1
The third and fourth spaces indicate_____ 2
The second space alone indicates_____ 3
The second and fourth spaces indicate___ 4
The second, third and fourth spaces indicate_____ 5
The first space alone indicates_____ 6
The first and fourth spaces indicate_____ 7
The first, third and fourth spaces indicate_____ 8
The first, second, third and fourth spaces indicate_____ 9

Following out this system it will be observed that the punchings through the card in Fig. 27 correspond with the figures which are printed at the right.

The column of punchings in the space D shows two such punchings for each day. Of each pair of punchings the lower one indicates that the workman went out for his noon recess at approximately the hour permitted and for which the mechanism is set, and the upper perforation indicates his return at approximately the proper time.

Near the bottom of the card are certain provisions for controlling the recording machine, the time-keeper's bookkeeping machine, and for other purposes if desired. For example, the set of perforations F correspond to the particular workman, and serve to control the bookkeeping machine upon which the time-keeper keeps the account. They may, for example, cause the bookkeeping machine to print alongside of an amount the number or name of the workman, so as to show to whom the amount is credited.

The perforations G coöperate with certain pins in the recording machine to determine that the card is in proper position before the machine operates. The machine is controlled by a clock, which actuates mechanism adapted to record money values equivalent to elapsed time, calculated according to certain rates of wages per hour. Each machine may be adapted for any desired number of rates. The present machine is designed for ten different rates varying from each other by the amount of $2\frac{1}{2}$ cents per hour. The card contains at the bottom a number of circles numbered from 1 to 10, and the time clerk punches by hand one of these circles corresponding to the rate of wages which the workman is to receive. For example, in the present case the hole H indicates that the workman is to receive the sixth rate of wages. If the lowest rate were $12\frac{1}{2}$ cents per hour, this workman would receive 25 cents per hour.

For works which are so large as to require a number of different rates, greater than can be taken care of by a single machine, a plurality of such machines may be arranged to cover all the desired rates of pay. In such a case in order to prevent a stupid workman from putting his card into the wrong machine, the lower edge of the card may be notched at one or another of several marked points, and suitable stops provided in the machine which will prevent the card from being forced down to an improper depth, mechanism being also provided by which on failure of the card to be pushed home the machine will be prevented from operating. In the present example the card is shown notched at J for one machine and is marked at "B," "C" and "D" where it may be notched for any one of three other machines.

The card originally is of the outer contour indicated in dotted lines, and provided at each side with a shoulder K which limits its advance into the machine. At the end of each day when the record is made, a portion L at each edge of the card is cut or punched out so as to leave the shoulder K for the next day on a line corresponding to the new record to be made.

Referring now to the machine, and especially to Figs. 1 and 2, the card, which is indicated as a whole by the letter M, is inserted in a vertical position into a flaring mouth N through the top plate of the lower part of the machine. This lower part of the machine contains on the front side of the card the mechanism for printing and punching, at the rear side of the card the mechanism (controlled by the previous line of punches in the card) for transmitting the movement of the clock to the punching and printing mechanism. The intermediate part of the clock above the rear lower part includes a number of different rate mechanisms one or another of which is to be thrown into operation, according to the rate which is punched in the card. At the top of the machine is the clockwork and the immediately connected mechanism.

The main punching mechanism includes four sets of punches P (Figs. 3 and 11), each set consisting of four punches. There are two auxiliary punches Q, one above the other, for making the noon punchings. These punches are mounted slidably in a cross-bar R fixed to the left-hand side frame of the machine and in a guide bar S connected by arms U with the movable shaft $c$, collars T being arranged between the bars R and S. Fig. 3ª shows in detail the manner of supporting the punches and retracting them by means of the bar S engaging collars T on the punches. The forward and rear walls W and X respectively of the card pocket are supported from opposite sides of the machine, and preferably stiffened by angles Y (Figs. 11 and 18). These walls are perforated in line with the main punches P and auxiliary punches Q, so that the punches may force the small disks of paper beyond the inner wall of the pocket and into a rectangular tube Z (Fig. 11) which extends across the rear face of the rear wall of the pocket, and from which they are removed as hereinafter described.

The forward movement of the main punches P through the paper is effected by means of segments $a$, a face elevation of one of these segments being shown in Fig. 12. Each of these four segments is mounted upon an arm $b$ on a shaft $c$, and is raised and lowered independently of the others by means of a link $d$, so as to bring a desired one of the horizontal lines of the segment into conjunction with its four punches P. The holding of a segment in exact register as it moves forward is effected by means of notches $a'$ along one edge of the segment and adapted to be engaged by a tooth $a^2$ lying immediately in front of the notches $a'$. When each of the segments $a$ has been brought to the desired position, the segments are all moved inward by moving forward the shaft c, this shaft being mounted in slots e in the side frames of the machine for the purpose of permitting such forward movement. When the segments are moved forward, wherever a hole in a segment is in conjunction with a punch the punch will be unmoved; wherever a solid portion of the segment is in line with a punch, that punch will be pressed through the card to perforate the latter.

For the noon-hour punch a similar device comprising a solid segment f is used, mounted upon an arm g operated by an upwardly extending link h, the height of the segment f being comparatively slight and its position being calculated so that it lies normally above both of the auxiliary punches Q, but may be dropped to engage one or the other of these punches upon the operation of the noon mechanism.

At the right of the punches just described is a set of four type-carriers j, Figs. 18, 3 and 3ª, each corresponding to one of the punch-operating segments a and partaking of the same angular movements therewith. For the purpose of synchronizing these angular movements (Figs. 3, 11 and 18), the first of the arms b may have its hub k set rigidly on the shaft c and the first of the type-bearing arms j may have its hub l similarly set at a fixed angle on the shaft. The hub m of the second arm b may be connected to the hub n of the corresponding type-carrier by means of a connecting arm p parallel with the shaft. The third arm b may be connected by a lateral extension q with a stiff longitudinal connector r which is connected to a similar extension q' on the corresponding type-carrier, and the fourth arm b may be connected by an extension s with a longitudinal connector t connected to a corresponding extension s' upon the proper type-carrier. The longitudinal connections c, p, r and t are so located as to oscillate without interference with each other (see Fig. 11). Thus each of the type-carriers receives its movement from its corresponding punch-operating segment.

Each of the type-carriers j carries at its edge a double set of type from 0 to 9, the normal position being as shown in Fig. 12. The individual types u (Fig. 3ᵇ) are guided at their rear ends in guides v on the carriers j, and are pressed backward by springs w. The rear ends of the types u (Fig. 18) lie in the planes of four hammers x (Fig. 3), the points of these hammers being adapted to strike in line with the printing to be effected. That is to say, when a type-carrying segment is swung to position to bring an appropriate type in line the hammer strikes the rear end of this type. The front wall W of the pocket is appropriately cut away at the point where the printing is to be done, and the inking ribbon y passes between the type-carrier and the pocket at this point, the ribbon being passed entirely around the printing mechanism and having its opposite ends wound respectively on two spools z.

A pair of square-headed punches 11 (Fig. 3) are mounted at opposite sides of the machine in suitable brackets and pressed back by springs 12, their heads serving to cut off the shoulders at the edges of the card, as previously explained. These punches are operated by arms 13 which are raised and lowered by means of links 14 extending upward therefrom (Fig. 18) and are held upward by such links, except for the operation at the end of a day, when they are lowered to a position in line with the punches, so that upon the forward movement of the shaft c the shoulder of the card is cut off to a higher point.

The punching movements are effected as previously explained by the shifting of the shaft c toward the card. As far as the types are concerned, however, these are merely brought nearer to the card by this shifting movement of the shaft. The actual printing must be effected by a hammer blow. Consequently (Fig. 18) the several hammers x are arranged to be actuated each by means of a projection 15 mounted upon an arm 16, the hammers and the arms 16 being mounted independently of each other upon a short shaft 17, and each arm 16 having at its outer end a strong spring 18 tending to pull the arm upward and to actuate the corresponding hammer. When the arms 16 are drawn downward, as hereinafter explained, retracting springs 19 draw the hammers to their outer positions. Each arm 16 is normally held down by a hook 20 pulled inward by a spring 21 and pivoted at 22, and having a short arm 23 which at a proper moment is subjected to an upward pull from a shoulder 24 on a link 25, which upward pull throws the hook 20 out of engagement with the arm 16 and allows the latter to be pulled upward and to throw the hammer forward. For each of the hammers x there is a separate arm 16, hook 20 and link 25. Normally the shoulders 24 are beyond the horizontal arms 23 of the hooks, so that any movements of these shoulders is without influence upon the hammers. But when the machine is to be operated, the proper links 25 are thrown over to bring their shoulders 24 into operative positions, and this movement of the links 25 is effected by means of arms 26 pivoted upon shafts 27 which receive an appropriate movement from the mechanism which sets the punch-operating segments in position.

The springs 28 attached to the upper ends of the links 25 tend always to give them the upward jerk necessary to operate the hammers. But the operation of these springs is normally restrained by a rod 29 lying in the lower ends of slots 30 in the links, and carried upon the end of arms 31 fixedly mounted on the shaft 17 and which is normally held down strongly, and which is not released until the handle of the machine is pulled. The arms 31 are fast on the shaft 17, but the several hammers $x$ and arms 16 are loose thereon. The rod 29 serves also for retracting the links 25 and bringing the arms 16 down until they are caught by the hooks 20 after the hammers have been operated. In order (see Fig. 11) to effect the described oscillation of the shafts 27, these shafts are provided at their left-hand ends, beyond the partition $27^a$, with arms 32 carrying at their upper ends pins 33 lying normally in notches 34 of levers which operate the links $d$ for setting the punch-operating segments.

The movements of the links $d$ for setting the punch-operating segments are obtained by links 35 in the rear part of the base of the machine, which may be called "difference" links, and of which there is one for each of the four columns of punches. These links 35 are moved upwardly or downwardly a distance depending upon the interval of time during which the clock has operated. Each segment-operating link $d$ receives its movement from a lever 36 (Figs. 11 and 17) pivoted upon a rod 37 passing between the side walls of the machine.

If the subtrahend figures were in each case smaller than the minuend figures from which they are subtracted, a simple lever would be sufficient to transmit the movement of each link 35 to the corresponding link $d$. This of course is not always the case. Where a figure is to be "carried" to the subtrahend of the next higher decimal place, the actual movement of the difference link for this higher decimal place will be one figure greater than it should be. For example, in subtracting 57 from 75 the difference link of the units place will move downward correctly to a position corresponding with the figure 8, but the difference link of the tens place will move upward to a position corresponding to the figure 2. In such cases it is essential that the upward movement of the difference link be diminished by one. Now whenever there is a subtraction of a larger figure from a smaller one there is a downward movement of the difference link; consequently whenever there is such a downward movement there should be a diminishing of the figure of the next higher decimal place. Between the levers 36 are arranged levers $36^a$ pivoted upon the same shaft 37, their rear ends prevented from upward movement by a fixed rod $36^b$ and having at their rear ends lateral projections $36^c$ projecting under the rear ends of the levers 36 on the side corresponding to the lower decimal place. The lever $36^a$ has at its forward end a hook $36^d$ which upon the depressing of the rear end of the lever releases the nose $36^e$ of a lever $36^f$ which is pivoted at its upper end and provided with a rearwardly projecting arm carrying a roller $36^g$. It will be understood that in Fig. 17 the successive levers 36 and $36^a$ are shown laterally separated for the sake of clearness. In practice they are closed up against each other so that the hook $36^d$ overlies the nose $36^e$ and the lever 43 (see below) is in the plane of the roller $36^g$. The forward end of each lever $36^a$ is held down by a spring $36^h$.

The release of the nose $36^e$ is made to diminish the upward movement of the next difference link 35 by the following mechanism: A small two-armed lever 38, 39 is pivoted at 40 upon the main lever 36, and is connected at the end of the arm 39 by a pin 41 fixedly with the difference link 35, the pin 41 passing through a slot 42 in the end of the main lever 36; this slot being sufficiently long to permit the pin 41 to move upward a distance corresponding to one unit. The arm 38 of the two-armed lever is connected to the end of a link 43 which is slotted on the shaft 37 so that it may move longitudinally thereon. The link 43 is pulled forward by means of a spring 44 connected to the outer end of the link and to a suitable arm on the main lever 36, and is normally held against forward movement by having its forward end $44^a$ abutting against the adjacent roller $36^g$ as in Fig. 11. When the roller $36^g$ is freed to permit it to move downward, the link 43 is free to move forward under the influence of its spring 44 except as it is restrained by the difference link 35. It will be remembered that an increase in the minuend is indicated by an upward movement of the difference link. If the minuend be greater than zero, so as to actually move the difference link up, then the first unit will be taken up by the movement of the pin 41 in the slot 42, and will not be transmitted to the link $d$. This movement of the pin 41 will result in pressing the link 43 as far forward as possible, after which the further upward movement of the difference link will cause the main lever 36 to swing properly about the shaft 37. Whenever a subtraction is performed the minuend is first recorded, and this results in an initial upward movement of the link 35 even though the net result of its upward and downward movement be a downward change of position. Consequently this diminishing of the minuend by one takes place in every operation whether the ultimate position of the difference link 35 be raised or lowered from the zero position, if the corresponding roller 36$^g$ has been released by a downward movement of the next lower link 35.

After the operation of the machine and upon the return of the hand lever to its backward position the several levers 36$^f$ are swung upward by swinging the shaft 36$^j$ upon which they are all loosely mounted and which is provided with fixed arms carrying fixed pins 36$^k$ engaging the rear faces of the several levers 36$^f$. This operation of the shaft 36$^j$ is effected by means of an arm 36$^m$ (Fig. 30) which is linked to an arm 233 which in turn is connected to an arm 179 on the left-hand end of the main hand shaft 23 as hereinafter described.

Each link 35 carries at its upper end a difference pinion 54, the upper end of the link and the pinion being mounted at the end of a swinging arm 55 pivoted on a shaft 56. At the front side of each pinion 54 is a rack 57, the position of which is determined by the holes in the line on the card previous to the line which is about to be punched. At its rear side the difference pinion 54 engages with a toothed segment 58 the position of which is determined by the position of the clockwork. The amount represented by the position of the toothed segment 58 may be considered as a minuend, and the amount represented by the position of the rack 57 as a subtrahend. As the amount represented by the segment 58 increases, the portion of this segment in engagement with the difference pinion 54 moves upward. As the amount represented by the rack 57 increases, this rack moves downward. Consequently the position of the center of the pinion 54 moves upward at a regular rate as the minuend increases, and downward at a regular rate as the subtrahend increases; that is to say, the movement of the center of the difference pinion corresponds to the variation of the difference between the minuend and the subtrahend. As the minuend increases and the difference increases, the difference pinion moves upward and the links $d$ and segments $a$ move downward. Since these segments start in their middle position representing zero, the downward movement of each segment corresponds to an increase in the figure represented, as it should. On the other hand, as the subtrahend increases there is a downward movement of the difference pinion and an upward movement of the segments $a$, and a corresponding backward movement of the numbers through 0, 9, 8, etc.

The control of the movement of the subtrahend rack 57 is effected by means of pins 59 the forward ends of which lie in suitable holes in the rear wall X of the card pocket, and the rear ends of which pass through a cross-bar 60. The pins 59 are arranged in groups of four similar to the groups of punches P, but lying in the plane below that of the punches P. Each pin is provided with collars 61 and 62, and the pins are moved forward and backward by means of a cross-bar 63 through which they pass. On the rearward movement of the arms 64 and the cross-bar 63 carried thereby, all the pins are shoved by their springs back to their normal starting position. On the forward movement of the cross-bar it acts upon each of the pins through the intermediation of a coiled spring 65. Where the card, on the line immediately below that which is about to be punched, has a perforation coinciding with the end of a pin 59, the compression of its spring 65 causes this pin to pass through the card. Where the forward end of the pin meets a solid part of the card there is no movement of the pin. The movement of some of the pins 59, and the standing still of other pins, determines the amount of movement of each of the subtrahend racks 57.

The control of each of the racks 57 by the pins 59 is effected by the following mechanism: For each of the racks 57 there are three levers 66, 67 and 68 (see Figs. 11, 11$^a$ and 13 to 16) pivoted on the shaft 56 and having their rear ends pulled upward by means of springs 69. The rack 57 is mounted on a plate 70 which is likewise pivoted on the shaft 56 and is adjacent to the inner lever 68. The plate 70 has at the outer end of its lower edge a flange 71 which takes under the edges of the three levers 66, 67 and 68. Fig. 11$^a$ illustrates this feature. The upward movement or holding of the several plates 70 is effected by means of a common lifting or retracting rod 72 carried in arms 73 (Fig. 3) keyed on the shaft 56. The desired subtracting movement of the plate 70 is effected by the springs 69 which pull the plates 66, 67 and 68 down as far as they are permitted to move. Each of these plates has an extreme limit of movement determined by a shoulder 74 at its rear side which engages a fixed stop-bar 75 mounted on the rear wall of the machine. In order to make the movements of the plates correspond to the figures to be punched and printed, their movements are also limited by the position of the pins 59. Each of the plates 66, 67 and 68 has on its forward edge a cylindrical flange 76, 77, 78, respectively, and the rear ends of the pins 59 lie in the paths of movement of these several flanges, which overlap each other, as indicated in Fig. 3. These flanges 76, 77 and 78 are provided with circumferential slots and solid portions of such arrangement and length as to permit the movement of one or another of the plates 66, 67 and 68 one step forward (downward) for each succeeding figure represented by the perforations in the card and the positions of the pins 59. The horizontal spaces 79, 80, 81 and 82, indicated by dotted lines in Figs. 13, 14 and 15, correspond with the horizontal arrangement of the four pins 59 of one group, which pins we may call the first, second, third and fourth pins of that group, since they correspond with the first, second, third and fourth spaces upon a horizontal line of the punched portion of the card.

Referring to the previously stated rule or table of punchings, it will be seen that 0 is represented by no punchings. Where the card indicates 0 therefore none of the pins 59 will move forward; and the plate 66 will be held up by the first pin, the plate 67 by the second, and the plate 68 by the third, so that there will be no movement of any one of these plates and no movement of the subtrahend rack 57. For the figure 1 a hole will be punched at the third space, the third pin alone will be withdrawn from under the portion 83 of the plate 68, and this plate alone will move downward until the shoulder 84 strikes the fourth pin. The subtrahend rack will move accordingly; the distance being equivalent to one unit. The figure 2 calls for the punching of the third and fourth spaces, and the withdrawal of the third and fourth pins from under the portions 83 and 84 of the plate 68, so that this plate will fall another step to the shoulder 85, and the subtrahend rack will move accordingly.

For the figure 3 the second space alone is punched and the second pin 59 is withdrawn from under the shoulder 86 of the plate 67, so that this plate moves downward until its shoulder 87 (which is three units above the lower edge of the plate) strikes the fourth pin and is stopped thereby. The figure 4 is represented by punchings in the second and fourth spaces, and therefore releases not only the shoulder 86 but also the shoulder 87, so that the plate 67 moves down to the distance of the shoulder 88. For figure 5 spaces two, three and four, and the three shoulders 86, 87 and 88 are released, and the plate 67 is stopped at the shoulder 89, the distance of which above the lower edge of the plate corresponds to five units. For the remaining figures the plate 66 is used, these figures corresponding to punchings in the first; first and fourth; first, third and fourth; and first, second, third and fourth spaces. Consequently the shoulders 90, 91, 92 and 93 are successively released and carry the plate down successively to positions corresponding with six, seven, eight, and nine units. The shoulder 74 of the plate 66 comes into operation to limit the downward movement of the plate to nine units. Similarly plate 67 is limited to five units and 68 to two units. Thus it will be seen that the plates 66, 67 and 68 control or direct independently of each other the movement of the subtrahend rack, and they may be called for convenience the subtrahend plates. For figures 1 and 2 the plate 68 is utilized; for figures 3, 4 and 5 the plate 67, and for figures 6, 7, 8 and 9 the plate 66. The advantage will now be seen of arranging the punchings according to a regular system, the figures of the first group having in common a punching in the first space on a line, those of the second group having in common a punching in the second space, and those of the third group having in common a punching in the third space (and so forth, for any extension of the system to include a different number of characters to be represented or a different number of punchings to be combined in a line or equivalent space). By so arranging the punchings the mechanism controlled thereby is considerably simplified.

Of the minuend segments 58 there are four, one for each of the columns on the card and corresponding groups of pins 59. Each segment is pivoted upon the shaft 56 and is rotated by means of a larger segment 94 fastened to it and engaging a vertically moving rack bar 95; the rack bars 95 being actuated from the clock as hereinafter described.

The positions of these rack bars, and consequently of the minuend segments, represent the total travel of the clock. The positions of the subtrahend racks 57, under the influence of the previous (that is, next lower) row of punchings represent the amount registered at the last previous operation of the clock. Thus at the beginning of the week with a new card there will be no punched line below the one which is about to be punched and printed. Consequently the subtrahend racks 57 will be stationary, and the amount printed and punched will represent the total movement of the clock at that time, say from midnight to seven o'clock. At the next operation (ordinarily on the evening of the same day) the previously punched line will determine corresponding positions of the subtrahend racks, and the minuend segments will stand in positions corresponding to the total travel of the clock, say from midnight to seven o'clock p. m. The difference pinions will therefore stand in positions corresponding to the elapsed time between the first and second operations, and will cause the punching and printing of the card to represent the wages earned for that day. For example (see Fig. 27) we may suppose that at the time of the first operation the mechanism stood in a position to record $12.50. This amount is therefore printed and punched on the lowest line. At the end of the day we suppose the mechanism to have moved forward to a position to record $17.50. The amount printed and punched on the card will be the difference between the total movement of the mechanism ($17.50) and the number previously printed and punched ($12.50), or $5. We suppose the clockwork to be thrown out of gear over night. The next morning's operation will punch and print the difference between the total travel of the clock ($17.50) and the amount of the previous record ($5), or a difference of $12.50. Supposing a full day to be put in, the total adopted to be recorded by the clock at the end of this day will be $22.50, and the amount printed will be $22.50, minus $12.50, or $10. Similarly on the next day if a full day's work is accomplished, the card will record $12.50 and $15. The next morning we suppose the workman to be late in arriving by a length of time equivalent to 50¢. The clock will have been running during this time, and will have increased the minuend total from $27.50 to $28, and the subtracting of the previous record ($15) will cause the amount of $13 to be entered. At the end of the day the total (which proceeds regularly by additions of $5 per day to the original arbitrary amount of $12.50), will be $32.50, and the subtraction of $13 from this will leave $19.50 as the amount due at the end of this day. On the next morning we suppose the workman to have arrived in time, and the record will be the same as for the previous morning ($13). But the workman quits so early in the day that the minuend shows a total of only 3600 (instead of the 3750 which would be shown at the end of the day), and the record shows $23 (3600 minus 1300) due at the end of this day. By a similar process the machine is adapted to record $25.50 as the amount due at the end of Saturday. This system therefore shows not only the amount due for each separate day, but whether the loss of a full day was due to a late arrival or an early departure. The amounts recorded for the morning of each day are mere instrumentalities in the calculation of the amount due at the end of the day.

The rack bars 95 (Figs. 9 and 10) are moved, through suitable intermediate gearing, from a vertical shaft 96 upon which the movement of the clockwork is impressed. Ordinarily the shaft 96 merely operates the intermediate mechanism, the latter being out of engagement with the rack bars, and being gradually moved forward to positions corresponding with the movement of the vertical shaft; and when the machine is operated this intermediate mechanism is brought into engagement with the rack bars and insures that they shall move (by the operation of the hand lever) to positions corresponding with that of the intermediate mechanism. According as the rate of wages of the workman is greater or less, the movement impressed upon the intermediate mechanism and upon the rack bars is also greater or less. There are in fact a plurality of such intermediate mechanisms any one of which may be thrown into operation and each of which represents a different rate of wages. There are in the machine illustrated ten such rate mechanisms, as indicated in Fig. 1. A single rate mechanism is shown in Fig. 9, while Fig. 10 shows such parts of a complete rate mechanism as are necessary to control a single one of the four rack bars 95. All of the rate mechanisms are driven continuously from the vertical shaft 96, and when the machine is to be operated it automatically selects the desired rate mechanism and brings it into engagement with the rack bars 95, and so determines the amount to be recorded.

One of the rate mechanisms may be so proportioned as to register hours and minutes and fractions of a minute, while the others register dollars and cents. This particular mechanism may be used by special workmen, such as foremen and the like, of whom there are only one or two working at the same rate of wages. It is hardly worth while to have a special mechanism for each such special rate of wages, but a mechanism arranged to register the time may be used by all the workmen who receive such special wages. The time-keeper will of course have to calculate the amounts due to such workmen from the times shown on their cards, and such cards may be specially marked or colored or shaped to indicate that they are true time cards as distinguished from pay cards.

Each rate mechanism includes a driving shaft 97 geared with the vertical shaft 96 and actuating a driven shaft 98 with a speed ratio depending upon the two pinions 99 and 100; and these two pinions are different for each of the ten rate mechanisms. These pinions are readily detachable from their shafts by means of knurled thumb-nuts 101, so that the relative speed of the shaft 98 may be set to any desired point. The changing of the pinions 99 and 100 is all that is necessary to change a machine from one set of rates to another set. The shaft 98 carries a sleeve 102 which is rotated from the shaft 98 with a step by step motion by means of an escapement. An escapement wheel 103 is provided with five teeth. Each rotation of this wheel corresponds to 5¢, and the distance between each two teeth corresponds to 1¢. If it were desired to determine the wages to the nearest nickel, as is done in some work-shops, the escapement wheel might be provided with but a single tooth. This escapement wheel is fixed on the sleeve 102, and is connected by a spiral spring 104 with the shaft 98, so as to permit the latter to rotate continuously, the escapement wheel following it intermittently. The anchor 105 of the escapement is carried upon a sleeve 106 which is pivoted upon the shaft 97 and which has an operating arm 107 the end of which is lifted and lowered at proper intervals by a cam wheel 108 having in the present case five lifting projections, and which is also connected by means of a spiral spring 109 with the shaft 98. The sleeve 102 carries a pinion 110 engaging a pinion 111 on a second shaft 112. The driven pinion 111 has ten teeth, and is the pinion which is brought into engagement with the first or unit rack bar 95 at the proper moment. Rotating with the pinion 111 is a disk 113 having a single tooth 114 adapted upon each revolution of the pinion 111 to engage a disk 115 provided with ten notches and to move the same a distance of one notch. This notched disk 115 is fixed on a sleeve 116 (Fig. 9) which carries the driving pinion 110 of the "tens" group of wheels. The driven pinion 111 and disk 113 carry with them also a disk 117 which is provided with a stop 118 adapted to engage a stop 119 fixed upon the rear wall 120 of the machine, the under side of the stop 118 being abrupt and the upper side being inclined. The shaft 112 (Figs. 9 and 10) carrying the several groups of pinions 111 and disks 114 and 117 is carried in the ends of links 121 (Fig. 22) which pass under the shaft 98 and are connected at their front ends to arms 122 depending from a pivotal shaft 123. The links 121 are normally drawn toward the back of the machine by spring 123ª, the forward movement of the frame being limited by the shaft 97. The weight of the shaft 112 is supported by its ends passing through slots 125 in the side walls 126 and 127 of the machine. The shaft 112 is thus pressed forward yieldingly. The rotation is in the direction of the arrows (Fig. 10). As the stop 118 of any particular group of wheels comes up against the under side of its fixed stop 119 and the disk 117 continues to rotate, the shaft 112 is pushed back bodily, so that there is no interference with the rotation of the shaft. As each of the individual pinions 111 passes the position corresponding to the figure 9, the stop 118 rides past the fixed stop 119 as described, and rests immediately above the stop 119. At the same time the pinion 111 of the next order is given a step forward. Thus the positions of the four pinions 111 continually represent the number impressed upon that particular rate mechanism by the vertical shaft.

When it is desired to make use of a rate mechanism, it is moved bodily toward the rear of the machine to bring its several pinions 111 into engagement with the rack bars 95 and to bring the disks 117 so near to the fixed stops 119 as to prevent the stops 118 passing them in a downward direction. The several rack bars 95 are then subjected to a spring pull downward. Where a pinion 111 has passed one step beyond the zero position, the corresponding rack bar 95 will be pulled down one step, whereupon the corresponding stop 118 will strike the fixed stop 119 and prevent further rotation of the pinion and downward movement of the rack bar. The distance of the rotating stop 118 beyond the fixed stop 119 determines the figure represented by this element of the rate mechanism, and determines that the rack bar shall move downward only a distance corresponding to this figure. The positions of the four rack bars then represent the total of this rate mechanism.

The throwing in of the particular rate mechanism desired is effected automatically by certain punchings in the card. The actual movement toward the rack bars 95 is effected by means of the springs 123ª which are normally prevented from acting by means of pawls 128 (Fig. 2) each engaging an arm 129 on the outer end of a shaft 123. Each of the pawls 128 is held in position of engagement by a spring 130. Each arm 129 is also held down by a vertical bar 131 having a slot with a vertical portion 132 and a horizontal portion 133, the arm 129 having a pin 134 lying in this slot. Normally the holding bar 131 stands in the position of Fig. 2 and prevents the upward movement of all the arms 129, so that none of the rate mechanisms may be thrown into engagement with the rack bars. When the machine is operated, however, the slotted bar 131 is thrown upward so as to release all the arms 129, and one of the pawls 128 is withdrawn, so that the desired rate mechanism is entirely free to operate. Fig. 2ª shows the position with one of the rate mechanisms operated and the others not operated.

The selection of the rate mechanism is therefore effected through the pawls 128. The pawls 128 are mounted on shafts 132ª (Fig. 22) extending across the machine in the intervals between the successive rate mechanisms, and each of the successive shafts 132ª is provided with a rearward arm 133ª (Fig. 22), these arms being distributed laterally so that no two of them lie in the same vertical plane, and the connections of them hereinafter described do not interfere with each other. Each arm 133ª (Fig. 22) is connected to a rod 134ª which runs to the bottom part of the machine, where it is connected by means of a pin 135 (Fig. 11) in a curved slot 136 to a plate 137. The several plates 137 are continually subjected to the downward pull of springs 138. The several plates 137 are pivoted on a rod 139 and are connected to links 140 so as to form in effect two-armed levers connected to the rods 134ª and links 140. The ends of the several bent links 140 engage their appropriate rate pins 141, the latter being guided in the rear wall of the pocket and in a transverse supporting bar 142, and being pivoted at 143 to the ends of the links 140. When the several links 140 are free to push forward under the action of the springs 138, nine of these links will be withheld by their rate pins 141 striking the solid portion of the card; and the tenth rate will be selected by its pin 141 passing through the corresponding perforation in the card and permitting the link 140 to move forward and the corresponding rod 134ª to be pulled down and the corresponding rate mechanism to be set into engagement with the rack bar. After this downward movement of the lever 137 and the throwing in of the proper rate mechanism, there is a downward movement of the lower part of the pocket and the forward ends of the links 140, and a corresponding upward movement of the levers 137, and it is to provide for this upward movement that the pins 135 are arranged in slots 136.

For insuring the setting of the card in correct position in the pocket, the setting pins 144 (Figs. 32, 3 and 11) having beveled forward ends are arranged to pass through properly located perforations as G in the card, and if necessary to shift the card a little to get it into its proper position. These setting pins 144 are arranged to be pushed forward by the movement of any one of the rate pins 141. The setting pins are connected to a cross-bar 145 which extends across the fronts of the pivoted ends of the links 140, so that the forward movement of any one of these links causes the forward movement of both the setting pins. The retractile movement of the setting pins is effected by means of pins 226 (Fig. 32) hereinafter referred to.

The rate pins and setting pins enter the card at points which are a fixed distance from its lower edge, no matter what the day of the week. The punching and printing of the card take place and the subtrahend pins enter the card at successively higher points at each operation. Consequently it is necessary for the rate pins and setting pins to move a step downward for each operation. I obtain the desired result by the use of what may be called a "sub-pocket." The sub-pocket 147 is a comparatively shallow pocket closed at the bottom and in the plane of the main pocket, the latter being open at the bottom so that when the sub-pocket 147 is in the uppermost position (Fig. 11) it forms a continuation of the main pocket. The sub-pocket 147 is supported at its ends upon a pair of end plates 149 which carry also the rear guide bar 142 for the pins, and the sub-pocket and connected parts are guided on vertical rods 150 supported upon the base of the machine. When the sub-pocket moves down, the pivotal connection of the links 140 with the rate pins causes these links also to move downward and to swing the plates 137 which are connected to the rear ends of the links upward, the slots 136 preventing the transmission of any upward movement to the rods 134ª.

Before describing the clockwork and connections, it will facilitate understanding of the invention to describe the operation of the combination of mechanisms already referred to in detail. The workman has simply to insert the lower end of his card in the slot, pushing it down firmly to the bottom of the slot, and then to pull forward the handle (Figs. 1 and 2) of the lever 151 which is mounted on the right-hand end of the hand shaft 152. The handle should be pulled as far forward as possible, and then allowed to swing backward under the pull of its spring 153. The several rate mechanisms are first locked against further rotation of their pinions, and in positions corresponding to even cents or even nickels, so as to insure easy engagement with their rack bars. At the same time, or immediately thereafter, the vertical locking bar 131 (Figs. 2 and 19), which prevents the forward movements of the rate mechanisms, is lifted to release them. Thereupon (see Figs. 11 and 22) the setting pins and the desired single rate pin enter the lower part of the card and the desired rate mechanism is brought into engagement with the vertical rack bars 95, the subtrahend pins enter the perforations of the previous line on the card, and the subtrahend racks 57 move downward to their appropriate positions. The several vertical rack bars are pulled down by springs, and the minuend segments 58 take their appropriate positions. This results in the setting of the punches and types in their proper positions for making a new record. The noon punch-operating mechanism is held in inoperative position, and the shaft c carrying the several punch-operating devices moves forward to effect the desired punchings at the left of the card and the cutting off of the shoulders at the edges of the card; and the type hammers are operated to print the proper record at the right of the card. The bits of paper punched out of the card are blown out of the machine. The release and backward movement of the handle restore the parts to their normal positions. Preferably mechanism (of a kind familiar in this class of machines) is provided which prevents any backward movement of the handle until the forward movement has been completed.

Before the hand lever is operated, or can be operated, the setting pins and the appropriate rate pin must enter the corresponding perforations in the card. For this purpose the main hand shaft 152 is provided with an arm 182 (Fig. 11) the end of which is normally engaged by a hook 183 on a shaft 184 having arms 185 connected by links 186 with triangular plates or levers 187 carrying a rod 188 which runs transversely along the front edges of the several pivoted plates 137 which are connected to the rate pins. When any one of the rate pins moves forward its plate 137 presses forward the rod 188 so as to withdraw the hook 182 and release the main hand shaft.

For locking the rate wheels a clutch 154 (Figs. 1, 2 and 19) is provided, the upper member of which is carried by the vertical shaft 96, and the lower member held against rotation, and this clutch is rendered effective by means of a rod which throws the fixed member of the clutch up into engagement with the member on the shaft 96 and prevents further rotation of the shaft (the clockwork, however, is not stopped, as will appear hereinafter). The upward movement of the movable member of the clutch 154 is effected by means of a pivoted arm 154ª the end of which is engaged by a spring 155 connected to the upper end of a rod 156, the lower end of which straddles the main hand shaft 152, while a roller 157 at an intermediate point rides upon the edge of a cam 158 on the shaft 152 just inside of the right-hand wall of the base of the machine. As the shaft rotates, the rod moves upward and puts a tension on the spring 155, which lifts the arm 154ª and causes the clutching action. The further upward movement of the rod 156 causes a shoulder 159 thereon to strike the vertical locking bar 131 and to lift the latter so as to release the several rate mechanisms from its control.

The upward movement of the rod 156 (Fig. 19) affects only the clutch 154 and the locking bar 131. The noon bar 162 adjacent thereto (Figs. 21 and 21ª) normally stands in a position to hold unlocked the regular calculating and punching mechanisms, but during the noon hour moves to a position to lock these mechanisms and at the same time renders the noon punching mechanism operative, and the mechanism for cutting off the shoulders at the edges of the card inoperative. The movement of the noon bar to effect the operation of the locks is effected by means of a pin 160 (Fig. 21) which is connected by a spring 161 to a lower point of the noon bar 162, and which passes through a slot 160ª in the noon bar. At all times except during the noon hour the bar 162 is raised, as in Fig. 31, and the pin 160 being engaged by the lower end of the slot 160ª causes the lifting of an arm 168 on a short shaft 169 which carries a hooked arm 170 which is connected by a link 171 with an arm 172 on a shaft 173 carrying a number of locking arms 174 with projections arranged to enter locking slots in the vertical rack bars 95 (Fig. 21).

The withdrawal of the hooked plate 170 from the end of the arm 175 releases this arm and allows it to be drawn down by a spring 176 engaging a pin 177 on the arm, and which spring is fastened to a link 178 operated by an arm 179 on the main hand shaft 152 (Fig. 21). The arm 175 is on a shaft 180, which, within the machine, carries the arms 64 which serve to press the subtrahend pins 59 forward (see also Fig. 11). This operation, however, does not take place until the slot 181 in the upper end of the link 178, or a large part of said slot, has traversed the pin 177.

This normal and highest position of the noon bar 162 holds the lever 163 turned to such a position as to throw the link 164 forward. This link passes at an intermediate point of its length from the inner side of the wall of the machine to the outer side thereof, (as shown in Fig. 2,) and connects at its forward end with an arm 165 of a shaft 166, which, within the machine (Fig. 18), carries the arms 167 from which depend the links 14, so that these links, and with them the segments 13, are held in their upper position which is their normal position and the one in which they operate the punches for cutting off the shoulders of the edges of the cards when the shaft c moves forward.

The operation of the subtrahend pins is accompanied by the downward movement of the rod 72 (Figs. 11 and 20), which is necessary to permit the several slotted flanges 76, 77 and 78 to move down under the influence of their springs 69 so as to carry with them the subtrahend racks 57. For this operation the shaft 56 carrying the arm 73 which supports the rod 72 is provided upon its outer ends with loose arms 189 (Fig. 20) outside of the side walls of the machine, and these arms have pins 190 lying in slots 191 at the upper ends of links 192 which are pivoted at 193 to arms 194 on the main hand shaft. The arms 189 have also at their ends pins 195 connected to upwardly pulling springs 196. The arms 189 have pins 197 projecting inward under arms 198 which are fixed on the shaft 56. Thus when the lever of the machine is pulled forward the slots 191 travel along the pins 190 until the subtrahend pins are operated, after which the pins 190 are pulled down, and with them the arms 189, thus releasing the shaft 56 and permitting the subtrahend segments to be forced down by their springs. The downward limit to which the arms 198 may move is determined by stop pins 199 projecting out from the side frames of the machine.

The downward movement of the rack bars 95 (Fig. 22), and the consequent upward movement of the segments 58, is accomplished by means of links 200 at opposite sides of the machine, the lower ends of which are pivoted at 201 to the arm 194 on the main hand shaft, the upper ends of which are slotted over a rod 202 which passes through the machine from side to side and is guided in slots 203 in the side walls of the machine. The rod 202 travels also in vertical slots 203ª in the several rack bars, and is connected to these rack bars through separate springs 204 for each rack bar. The downward movement of the racks causes a corresponding movement of the segments 94, as previously explained, the segments being fastened respectively to the minuend segments 58 so as to move the latter upward as the rack bars move downward.

Figure 25:
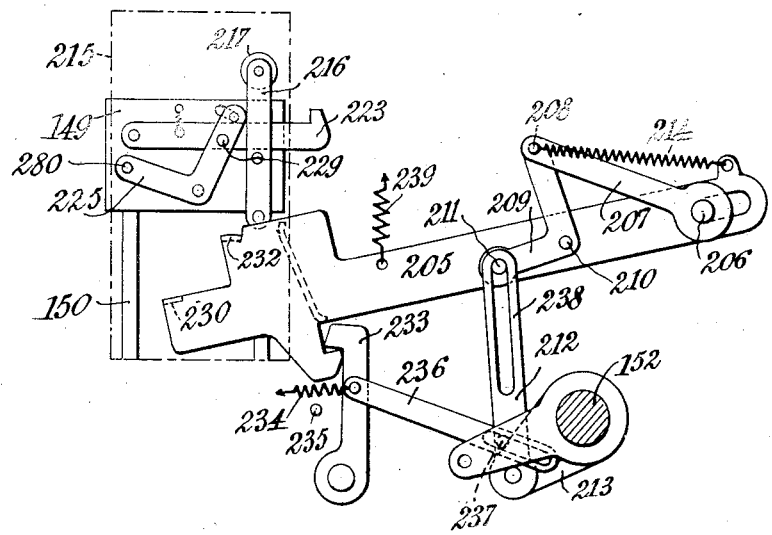
Figure 26:
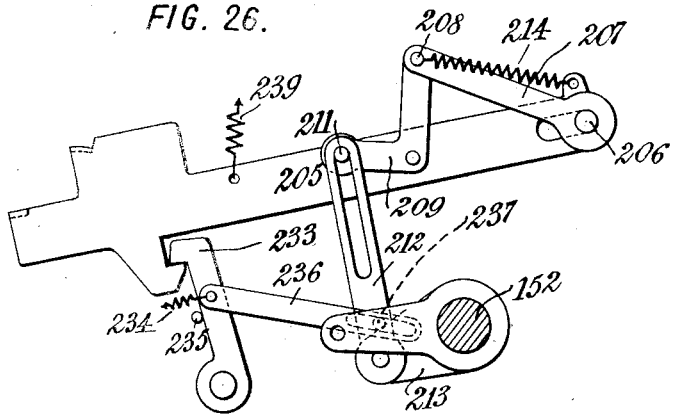

The operation of the sub-pocket calls for a particular mechanism, shown in the side view (Fig. 2), and on an enlarged scale in Figs. 23 to 26. Fig. 23 shows the normal position of the parts. Fig. 24 shows the position after the card has been slightly forced down, and the sub-pocket has been freed so that it may fall. Fig. 25 shows the sub-pocket dropped to the limit allowed by the shoulder on the card and the controlling link therefor shoved back, dropped and locked. Fig. 26 shows the position just before the release of the controller. The controlling link 205 is slotted at its rear end over a pin 206 fixed at the side frame of the machine. The mechanism is duplicated at the opposite sides of the machine. An arm 207 is loosely pivoted upon the same pin 206, and carries at its free end a fulcrum pin 208 of a bent lever 209 which is connected by a pin 210 to the controlling link 205, and by a pin 211 to a link 212 the lower end of which is pivoted to an arm 213 keyed on the shaft 152. A spring 214 connected to the pin 208 and to a lug on the controlling link 205 pulls the latter always toward the front of the machine. The downward movement of the arm 213 first shoves the pin 210 and the controlling link 205 backward over the pin 206, and then on the continued movement of the main shaft swings the link 205 downward about the pin 206.

The forward end of the controlling link 205 has engagement with the end plate 149 of the sub-pocket through an opening 215 in the side wall of the machine. Each plate 149 has on its outer face a lever 216 pivoted at an intermediate point to the plate 149 and carrying on its inner face a roller 217 at its upper end and an outwardly projecting pin 218 at its lower end. Pivoted upon the inner face of the side wall of the machine is a depending arm 219 drawn forward by a spring 220 and stopped by a pin 221. The lower end of the arm 219 is formed into a cam 222 above which the roller 217 lies in the normal position of the machine. The arm 219 is held in its forward position by a hook 223 pivoted at its forward end upon the side 149 of the sub-pocket and having its rear end hooked over the lower end of the arm 219 depending from the side wall of the machine; a spring 224 holding it upward. A bent lever 225 (Fig. 32) is pivoted at its angle upon the plate 149 and lies in a plane outside of the hook 223 and extends above the latter, carrying at its upper end a pin 226 which projects inward through a slot 227 in the end of the sub-pocket and which serves to limit the upward movement of the hook 223. This pin 226 serves also a more important function. It stands normally in front of the bar 145, as shown in Fig. 11, so as to normally hold back the setting pins 144 and the ends of the links 140 of the rate pins. It is only after the pins 226 are released that the rate pins and setting pins may be pushed forward through the card by their springs. This release of the pins 226 takes place as soon as the card is pressed down to move the sub-pocket slightly. The lever 225 carries a pair of outwardly projecting pins 228 and 229. The former bears on a shoulder 230 (Fig. 24) of the controlling link 205 and is thus held up, holding the pin 227 and the rate pins and setting pins back. The link 205 is thrown backward upon the first downward movement of the sub-pocket, and this releases the pin 228, allowing it to move downward and releasing the pin 226. The first backward movement of the controlling link 205 is effected by the pin 218 on the vertical lever 216, which pin engages a flange 231 upon the inner face of the link. As the sub-pocket moves down, the roller 217 at the upper end of the lever is thrown forward by the cam 222, and the pin 218 and controlling lever are thrown to the rear just a sufficient distance to allow the pin 228 to pass over the shoulder 230. The pin 229 although moved forward as in Fig. 24 will still rest upon the shoulder 232 of the controlling link, and by this means the sub-pocket will be held up by the controlling link until the further movement of the main hand shaft. The main hand shaft up to this moment has been locked by the hook 183 (Fig. 11), as previously described, but is now released, pins 144 entering the last line of perforations in the card which has been inserted in the slot, and permitting the lever 140 to move outward, turning the lever 137 and pulling upward the link 186.

Upon the first forward movement of the hand lever the controlling link 205 is shoved clear to the rear (Fig. 24), as previously explained, and this action releases the pin 229 from the shoulder 232, after which the sub-pocket is free to (Fig. 25) fall. The rate pins and setting pins having been passed through the perforations in the card; the three parts,—sub-pocket, pins, and card,—fall by their weight until the shoulders at the edges of the cards strike the corresponding stops at the side of the machine. The card is then in the proper position for the punching and printing of the next line. The position of the sub-pocket corresponding to this position of the card is shown in Fig. 25. It will be understood that the shoulders 230 and 232 on the controlling link 205 project inward beyond the plane of the link so as to release the pins 228 and 229 in the manner described. (See Figs. 3 and 23ª.)

The further movement of the hand shaft 152 swings the controlling link 205 and connected parts down to the position of Fig. 25, where the controlling link is caught by a hook 233 pulled forward by a spring 234 against a stop 235 and connected to a link 236 the rear end of which is slotted over a pin 237 on the arm 179 of the hand shaft 152. The hook 233 is intended to hold the controlling link down until the punching and printing and other operations are completed and the punches withdrawn by the first part of the backward movement of the hand lever.

The position of the controlling link and connected parts at the end of this first part of the backward movement of the hand lever is shown in Fig. 26. The pin 237 does not engage the rear end of the slot in the link 236 until near the end of the backward movement of the hand shaft 152. The slot 238 in the upper end of the link 212 permits the same movement of the shaft without pushing up the pin 211 to restore the controlling link 205. The further movement of the hand shaft withdraws the hook 233 (Fig. 23), whereupon the spring 214 pulls the controlling link 205 forward and the spring 239 restores it to its upward position. Upon the upward movement of the controlling link 205 the shoulders 230 and 232 engage the pins 228 and 229 and lift the sub-pocket, at the same time pressing back the pins 226 so as to withdraw the setting and rate pins and permit the withdrawal of the card.

The punching and printing operations are effected as previously explained by a forward movement of the shaft $c$, which for this purpose works in slots $e$ in the side frames of the machine (Figs. 2 and 11). The outer ends of the shaft $c$ are connected to the upper ends of levers 240 (Fig. 2) which are pivoted at points intermediate of their length and are connected at their lower ends to links 241 the rear ends of which are slotted over the same pins 201 (Figs. 2 and 22) to which the lower ends of the rack-bar-operating links 200 are connected. The slots 242 of the links 241 are of such length that the pins 201 travel in the slots during nearly the entire forward movement of the handle. At the last moment, however (Fig. 22), when all the other mechanisms have been operated, the links 241 are shoved forward and the shaft $c$ backward and the punching operations are accomplished.

The operation of the printing hammers $x$ calls for the turning of the shaft 17 as previously explained. This shaft is provided on its outer ends with bent arms 242ª (Fig. 2) the lower ends of which are pulled rearwardly by springs 243. The links 241 carry rollers 244 engaging the arms 242ª. The shape of the engaging edges of the arms 242 is such that as the rear end of the link 241 is swung downward by the operation of the hand shaft, there is no operation of the arm 242, but in the final forward thrust of the links 241 the arms 242 and the shaft 17 are swung in the direction to operate the hammers.

The removal of the small pieces of paper punched out of the card is effected by forcing a puff of air through the tube Z into which these scraps of paper fall. For this purpose the tube is connected at its right-hand end with a tube 245 (Fig. 1) coming from the lower end of a cylinder 246 which at the same time serves as a dash-pot to prevent too rapid operation of the hand lever. The main hand shaft 152 is connected by an arm 247 and a link 248 with the piston within the cylinder 246, the latter being preferably pivotally supported at its upper end on a pin 249. The left-hand end of the tube Z is extended beyond the mechanism and is open so that the pieces of paper are blown out of this end.

Shortly before the noon hour the noon bar 162 (Fig. 21ª) is moved downward a full interval, which results in the pulling of the link 164 toward the back of the machine, and in the turning of the shaft 166 (Fig. 2), this shaft carrying within the machine arms 167 which are thus swung downward. By means of the link $h$ (Figs. 11 and 3) the segment $f$ which operates the noon punches Q (which, it will be remembered, are arranged one above the other) is swung downward so as to be in position to engage the lower punch but to pass below the upper one. At the same time the links 14 (Figs. 18 and 3) swing far downward out of operative position the segments 13 which normally operate the punches 11 for cutting off the shoulders at the edges of the card. The downward movement of the noon bar 162 (Fig. 21) also (through the spring 161) presses down the arm 168 on the shaft 169, so as to hold down the plate 170 which locks the arm 175 and the shaft 180 through which ordinarily the subtrahend pins are advanced. The same movement or pressure on the locking plate or hook 170 acts through the link 171, arm 172, and shaft 173, to hold the lock 174 of the rack bars in its operative position in engagement with the racks 95 and thus to prevent the operation of the minuend segments. There will therefore be no movement of the segments $a$ engaging the racks 95 by which the main punches are operated. They will stand in their middle positions corresponding to the figure 0 (Fig. 12), so that there will be no operation of the punches when these segments are moved forward. The hammers $x$ of the printing mechanism (Fig. 18) will not be operated, since (by reason of the failure of the punch segment setting mechanism $a$ to move) the arms 32 and shafts 26 which normally hold the hooks 24 (Fig. 18) in their inoperative positions will be unmoved, and the hooks 20 will hold down the arms 16 whose upward movement normally operates the hammers.

At the middle of the noon recess the noon bar 162 will be raised, however, as in Fig. 21, one-half the distance through which it was lowered at the beginning of the recess. This movement is not sufficient to release the rack bars and the subtrahend-pins-operating mechanism. The link 164 however will be thrust forward and the shaft 166 turned back through half the distance through which it formerly moved forward. The arms 167 will be lifted and the segments 13 for operating the shoulder-cutting punches will be raised up to points immediately below the level of the punches so as to be still inoperative. The segment $f_2$ however, which operates the noon punches will be raised so that its lower edge is just above the lower one of the noon punches Q. Consequently the movement of the hand lever will merely operate the upper one of the noon punches.

At the end of the noon recess the noon bar will be raised to its original position, releasing the locks from the subtrahend pins and from the rack bars, restoring to their operative positions the segments which operate the shoulder-cutting punches, and lifting entirely out of operative position the segment which operates the noon punches.

The movements of the noon bar 162 are effected by the escapement mechanism shown in detail in Figs. 6, 7 and 8 and in the general plan view in Fig. 4. The shaft 250 has at its rear and in line with it a shaft 271 which carries a disk or segment 251 which is rotated once in twelve hours, and which segment has a forward shoulder 252 which is adapted to strike a pivoted arm 253 shortly before the noon hour. The circumferential edge 254 of this segment is of such length as to hold the arm 253 out for a period extending somewhat over an hour. (The position of the shoulder 252 and the length of the arc 254 may be such as to obtain operation at a desired moment and through a desired length of time.) A disk 255 concentric with the segment 251, but fixed on the shaft 250, has a number of holes 256 spaced apart a suitable distance, representing say five-minute intervals. Shoulders serving to effect the first, second and third movements of the noon bar are provided by means of arms 257, 258 and 259 pivoted on the shaft 250 and fastened by means of pins 260, so that their projecting portions 261 are at proper intervals and positions. Since in the construction shown the segment 251 moves very slowly, it would be disadvantageous to use this segment alone to effect the desired operations at the beginning, middle and end of the noon recess. It would be difficult to make it so accurate and keep it so accurately adjusted as to avoid variations of five or ten minutes. The disk 255, on the other hand, in order to be of conveniently small size and to be perforated for five-minute intervals, must be rotated once in three hours. Neither of these devices can therefore be used alone, but the two in conjunction serve to effect the desired operations promptly and with no substantial variation from wear or accidental change of adjustment. The projections 261 carried by the faster plate 255 strike the end of a pivoted arm 262. The operation of the noon bar is effected only when both the arms 253 and 262 are pressed outward.

The shaft 250 like the disk 255 rotates once in three hours. The slower movement of the segment 251 is effected by gearing down from the shaft 250. As shown best in Figs. 6 and 8, a pinion $250^a$ on the shaft 250 turns a larger gear $250^b$ on a short shaft $250^c$ carrying a pinion $250^d$ engaging a larger gear $250^e$ on the hub $250^f$ of the segment 251. The segment is adjusted to act on its arm 253 from shortly before noon to shortly after one o'clock. The three arms 257, 258, and 259 are adjusted to act on their escapement arm 262 at approximately noon, twelve-thirty and one o'clock. They act on it every three hours thereafter, but such action is futile except during the period in the middle of each day when the slow moving disk 251 acts in conjunction with them.

The disks 251 and 255 are near the front of the machine. The shafts 263 and 264, which are operated thereby, extend backwardly (see Figs. 6 and 7) and carry respectively a hook 265 and an ordinary two-armed escapement anchor 266. The hook 265 and one arm of the anchor engage teeth or projections 267 upon an escapement wheel 268 which is connected by a spring 269 with a drum 270 fixed on the shaft 271 on which also the hub $250^f$ of the slow-moving segment 251 is fixed. The escapement wheel 268 is provided with a pin 272 engaging in a slot 273 in the noon bar 162, the latter being drawn down either by its weight alone or by a special spring which may be introduced. When the slow-moving segment 251 operates the shaft 263 and disengages the hook 265, the spring tending to turn the shaft 271 is wound up so that as soon as the first projecting arm 257 actuates the escapement anchor 266 and the forward end thereof releases the tooth 267 of the escapement wheel and the rear end 274 moves up to stop the next tooth, the escapement makes but a slight step forward. The escapement anchor and the hook 265 are under the influence of springs 275 and 276 which keep the upper hooks constantly pressed toward the escapement wheel. As soon as the projecting arm 257 passes beyond the swinging arm 262 and releases the escapement anchor, the rear arm 274 of the latter is withdrawn and the escapement wheel moves forward until the next tooth engages the upper end of the anchor. The escapement wheel thus makes a third of a revolution, and presses down the noon bar 162 accordingly.

The movements of the noon bar 162, besides the effects upon the recording mechanism previously described, serve to disengage the vertical shaft 96 from the clock mechanism by swinging the lever 277 (Fig. 6) and lifting the clutch member 278 which rotates with the main driving shaft 279 coming directly from the clock. Ordinarily the clutch member 278 engages a mating clutch member 280 on a shaft 281 which is connected to the shaft 96 which actuates the rate mechanism. The disconnecting of this vertical shaft 96 from the clock-work serves to prevent the operating of the rate mechanisms and the registering of the time during the noon recess.

An over-time mechanism is provided whereby after a certain hour the clock may automatically shift its driving mechanism so as to rotate the vertical shaft 96 say twice as fast as during the ordinary hours of the day. This result is obtained by the shifting of certain clutches by means of disks or segments similar to those which control the noon-hour operations, as hereinafter described.

Mechanism is also provided which stops the operation of the adding wheels (rate wheels) at the end of a working day, and starts them again in operation at the beginning of the next day. This, like the other time mechanism, works by means of an escapement actuating a clutch controlling the vertical shaft 96.

The regular daily controlling shaft is indicated at 290 (Fig. 4) and the over-time mechanism shaft at 291, the relative position of the noon-hour shaft 250 being indicated on the same figure. A stepped partition 292 carries the rear bearings for these several shafts, the front bearings being carried in plates 293 and 294. A pinion 295 immediately above the over-time mechanism is driven by any suitable mechanism from the clock, and is the main driving pinion for the starting and stopping mechanism, the over-time mechanism, and the noon-hour mechanism. The power for the shaft 279 is taken separately from the clock, and this shaft 279 may be considered the source of power for the main vertical shaft 96 which drives the rate wheels. From the pinion 295 an identical pinion 296 above the regular starting and stopping mechanism is driven through an intermediate pinion 297 (Fig. 4). The pinion 297 drives two smaller pinions 298 loosely mounted on the shafts 290 and 291 respectively, so as to turn these pinions at a comparatively rapid rate. (The noon-hour shaft 250 is driven from the pinion 298 of the over-time mechanism by means of an intermediate pinion 298$^a$ and a gear 298$^b$ on the shaft 250.) On the front end of each of these shafts (290 and 291) is a large gear 299 driven at a slow speed from pinions 295$^a$ and 296$^a$ rotating with the gears 295 and 296 respectively. The slow gears 299, for example, may rotate once in twenty-four hours, and the shafts 290 and 291 so rapidly as to effect an accurate operation of the escapements within a minute or two of the time desired. The rapidly rotating pinions 298 carry arms 300, which operate the arms 301 on shafts 302 which carry at their rear ends the double-armed escapement anchors 302$^a$. The forward disks or slow gears 299 are fixed on the shafts 290 and 291 and carry arms 303 and 304 adjustably spaced and which in succession operate the arm 305 on the shaft 306 which carries at its rear end the single-armed anchor or hook 306$^a$. At the beginning of the time during which the mechanism is to run, the arm 303 on the slow-moving disk unhooks the escapement, and while it is held unhooked the fast-moving arm 300 comes into play and unhooks the double-armed anchor first at one side and then at the other, so as to permit the escapement to turn. The angle of movement in this case is a half revolution, so that alternate operations of the escapement start the mechanism in operation and stop it. The regular starting and stopping escapement, for example, may have its arms 303 and 304 arranged with a nine-hour interval between them, so that the apparatus will be operative during nine hours of the day, and inoperative during the remainder of the time. These escapement shafts 290 and 291 carry near their rear ends spring-carrying drums 307 and 308 respectively, by which the rotations of the shaft (at the rate of once in twenty-four hours) are conveyed to the escapement wheels 309 and 310 respectively which are engaged by the single-armed and double-armed anchors 306ª and 302ª, as described. Each of the escapement wheels 309, 310 makes a complete half revolution at each step, and each wheel is provided with a pin and slot connection to a lever operating a clutch for starting or stopping or varying the speed of the vertical shaft 96. The regular starting and stopping mechanism actuates a long lever 311 the end of which is connected to a clutch member 312 rotating with the shaft 281, which, as previously stated, receives its motion from the main driving shaft 279. When the escapement end of the lever 311 is raised at the beginning of a working day, the clutch member 312 effects an engagement of the driving shaft with the shaft 96 and the rate wheels are operated. When the next tripping action takes place and the escapement swings its end of the lever 311 down at the end of the day, the shaft 96 is unclutched from its driver. When, at the end of a working day, it is desired to increase the rate of pay for over-time work, the over-time escapement is set to operate at an appropriate hour (simultaneous with or subsequent to the unclutching of the shafts 281 and 96), and raises its end of a lever 313 the opposite end of which is attached to a clutch member 314 on a secondary shaft 315 which is rotated by means of pinions 316, 317 from the intermediate shaft 281, and at the same rate as said intermediate shaft. When the over-time escapement throws the clutch 314 down, an engagement is effected with the clutch member 315ª, so as to rotate the pinion 316ª, which engages a smaller pinion 317ª which is connected with the shaft 96. The main clutch 312 will of course be out of engagement at this time, and the shaft 96 will rotate at an increased rate, depending upon the ratio of the pinions 316ª and 317ª, which pinions may be readily changed to change the rate of increased pay for over-time. The movement of the pinion 317ª is transmitted to the shaft 96 through a drum 318 carrying a coiled spring which takes up the movement of the pinion 317ª while the shaft 96 is held stationary during the noon hour. Fig. 6ª shows this in sectional view. The over-time mechanism may be rendered inoperative whenever desired by pressing the exposed end 319 (Fig. 5) of a lever 320 mounted on a shaft 321 (Fig. 6) which at its inner end has an arm 322 engaging a sleeve 323 which carries the pinion 316 on the secondary shaft 315, so that as the end or button 319 is pressed, the secondary shaft is entirely disconnected from any driving shaft and there can be no further connection through this over-time mechanism of the driving shaft with the shaft 96. The pinions 316 and 317 are preferably beveled as shown to make their engagement easier. The button 319 may be provided with impositive stops for holding it in any position in which it is placed, with such strength that it cannot be moved accidentally but can be moved when intended. In order to permit of the lifting of the over-time clutch 314 when the over-time end of the lever 313 is lifted, this end of the lever is connected with the clutch end 324 by an interposed spring of any sort, whereby the disengaging operation is rigid and the engaging movement is yieldingly transmitted.

While the showing of the several subtrahend numbers upon the card, as in Fig. 27, is useful in understanding the operation of the machine, yet it is not in fact important in the actual use of the machine, and a cleaner and more easily read card may be obtained by suppressing these numbers and printing only the amounts due at the end of each day; the perforations corresponding to the subtrahends, however, being retained so as to control the next operation. Such a card is indicated in Fig. 29 and may be secured by merely suppressing the operation of the type-hammers when a subtrahend record is to be made. For this purpose the type hammers may be provided with noses or projections in position to be engaged by hooks 325 (Fig. 18) fixed upon a shaft 326 which shaft is rotated by means of an arm 327 (Fig. 30) connected to a comb-like arm 328 pivoted on a shaft 329 and adapted to be swung forward under a spring pressure at each operation of the machine. This arm 328 is at the left-hand side of the machine, and upon the corresponding side there is a lateral projection 330 from the movable sub-pocket adapted to register with the teeth 331 or the spaces 332 of the comb, the width of each of these teeth and spaces being approximately equal to one step downward of the sub-pocket. Consequently as the sub-pocket moves downward and the comb is pressed forward it will be stopped by the projection 330 at the first operation, but permitted to move forward at the second operation, and so on; thus moving forward and swinging the shaft 326 and locking the type hammers upon the odd-numbered operations of the machine, but failing to lock them upon the even-numbered operations. The forward pressure upon the shaft 329 is effected by means of an arm 333 (Fig. 11) within the left-hand wall of the machine which is connected by a spring 334 with a link 335 which is slotted upon an arm 336 on the main hand shaft 152. The link 335 is normally pulled forward by a spring 337 so as to hold the comb out of operation until near the end of the forward movement of the hand shaft.

The arrangement of the various perforations and projections in the pocket is made clear from Fig. 28, which shows the fixed shoulders 282 upon which the shoulders K of the card rest, the openings 283 through which the shoulder cutting punches pass, the apertures 284 through which the projections 338 (hereinafter referred to) pass for engaging the notch J of the card, the setting pin apertures 285, rate pin apertures 286, main punching apertures 287, subtrahend pin apertures 288, and noon punch apertures 289.

It is proposed to manufacture the cards and sell them to the owners of machines with the notches and perforations already made which determine whether the card belongs to clock "A," "B," "C," or "D," and whether the employee shall receive rate number 1, or 2, or 3, etc., the card being properly stamped to indicate the clock and rate, as at "A 6" in Fig. 27. The registering of each card with its particular clock is effected by means of the punch or projection 144 (Figs. 11 and 32) which is fastened to the plate 145 at a position corresponding with the notch J or with a similar notch in one of the spaces indicated at "B," "C," or "D." When the wrong card is put into the clock the projection 290 engages a solid portion of the card and prevents the forward movement of the bar 145, so that the lever of the machine will be locked, as previously explained. Where a single clock is used, the projection 290 is not necessary. Where more than one clock is used, they will be provided with projections 290 screwed on to the plate 145 at different points.

The sub-pocket mechanism controlled by the link 205 has, besides the advantages mentioned, the advantage of knocking up the card on the return of the lever so as to throw the card out of the pocket or out of the position in which the setting pins might again spring forward and permit a second operation of the machine. Upon the return of the hand lever backward the sub-pocket operating link 205 is held down by the hook 233 until the card has been freed by the withdrawal of the recording punches. When the hook 233 is finally withdrawn and the link 205 drawn upward by its spring 239, the forward position of the link 205 causes its outer end to strike the pin 228 so as to tilt the lever 225 and to press backward the pin 226 which withdraws the setting punches. The continued movement of the link 205 throws the sub-pocket rapidly up to its starting position so as to throw the card upward while the setting punches are out of it.

It may happen in some cases that it will be undesirable to print upon a card the exact amount of money due to the workman. In such a case the cards may be punched to indicate the actual wages in money, so that the time-keeper can use these cards in a bookkeeping machine as previously explained, and the column at the right may be arranged to show only the actual time in hours and minutes during which the workman was engaged. In order to secure such a result the printing mechanism previously described may be substituted by a simpler one, as shown in Figs. 33, 34 and 35. A main driving shaft 96ª, rotating say once in ten minutes, drives a horizontal shaft 339 mounted in bearings at the side of the machine. This in turn drives a shaft 340 extending from right to left and driving printing wheels 341, 342, and 343, by suitable interposed gearing and escapements, so that these wheels register successive minutes, tens of minutes, and hours. The minute wheel 341 is provided with ten teeth (Fig. 34) carrying at their ends fixed types corresponding to the ten digits. The ten-minute wheel 342 carries six similar teeth, and the hour wheel 343 twelve similar teeth. In order that one of the teeth on each of the printing wheels shall be exactly in printing position, an escapement is provided for the minute wheel whereby it moves by successive clicks instead of by a gradual movement. This intermittent movement will be similarly transmitted to the succeeding wheels which are driven from the minute wheel. The escapement anchor is indicated at 344 engaging a five-toothed escapement wheel 345 (which will give intervals of two minutes, which is sufficiently accurate for most purposes) which is keyed on the shaft 346 of the minute wheel and which is driven through an intermediate spring 347 from the shaft 340. The shaft 340 also carries the five-pointed wheel 348 which operates the arm 349 of the anchor shaft 350.

A second shaft 351 is arranged in the rear of the shaft 346 of the minute wheel. The ten-minute wheel and the hour wheel are free on the shaft 346. Motion is communicated from the minute wheel by means of a tooth or arm 352 rotating therewith to a ten-toothed pinion 353 loose on the shaft 351, and from the latter the ten-minute wheel is driven by a pinion having six teeth, so that the type wheel makes a revolution in six steps. Similar means are provided for moving the hour wheel one step forward for each revolution (six steps) of the ten-minute wheel.

The several shafts are mounted in a frame composed of a pair of plates 354, 355 connected together by the shafts and by stay-rods, which stay-rods are supported in slots in the side wall 356 of the machine. When the punch-operating mechanism previously described moves backward to effect the punching operation, the frame 354, 355 moves with it, carrying the types close up to the paper. At the same time the hammers 357 which are mounted on a spring 358 are drawn backward by a trip 359 which has an incline 360 engaging a fixed shoulder 370 in the machine so that as the arm 359 is pulled backward it is also lifted, and in its rearmost position frees the hammers 357 and allows them to strike the paper against the type, with the ribbon y between them.

The same forward movement causes a backward shifting of the driving shaft 339 which carries with it a clutch member 371, and this backward movement brings said clutch member into engagement with a corresponding member 372 which is fixed against rotation by being fastened upon the side wall of the machine. This stops the movement of the type wheels until after the printing operation has been effected and they have been drawn back to their forward position away from the paper.

The machine may be very much simplified by reducing the number of rates, or by omitting the rate mechanisms entirely, and used to record the amount of time spent by a workman upon each job on which he works during the day. It is customary to keep similar records, and by the use of a card for each particular job the items of time spent upon this job can be perforated and printed (or either) in successive lines and in such a way as to be easily readable and easily usable in a bookkeeping machine. The pocket and the adjacent mechanism will in fact find usefulness in a great variety of recording or punching mechines.

For renewing the ribbon y the box 373 carrying the spool z is mounted upon a plate 374 hinged to the base of the machine and normally held fast by a screw 375.

The invention includes various other styles of perforated cards of which the perforations indicate the workmen's time and usually serve to control recording mechanism; such recording mechanism either including a part of the punching mechanism as in the machine here illustrated, or being only a separate apparatus. These purposes may be served by a card like that of Fig. 36, for example, which is on such a simple system as to be punched by hand or by any simple perforating machine, or which may be punched by a perforator set in position by a clock such as is used for recording the time of workmen or of any other style. In this card the first section contains the employee's number and the succeeding sections the hours of departure and arrival for each day in the week, together with the indications of correct departure and return for the noon recess. The times are supposed to be represented in equivalent dollars and cents. Each of the successive digits is represented by a vertical column and each column is divided into ten squares. The perforating of the lowest square in any column represents zero, the next higher square "1," and so on. Where the workman arrives at or before the opening time in the morning, no punch is made. The noon recesses are indicated by punches arranged below the regular sections representing the arrival and departure of the workman. This card is supposed to represent the actual hours of arrival and departure, or their equivalent in money, but not the differences between the arrival and departure. It may be used with a reproducing machine, however, which subtracts one number from another, lists the difference, and adds this difference to previous totals in the account of a given workman. For one card, or one operation of such machine, all the differences obtained will be listed and added to each other simultaneously. The mechanism for making the noon punches is thrown in position to operate from 11.55 to 12.30 o'clock for the first column, and from 12.30 to 1.05 for the second, so that the card will be properly perforated if the workman does not begin his recess before 11.55 and does not extend it beyond 1.05; and in listing from such cards if any of the noon perforations is missing, a bell or other device will be operated to call the attention of the operator to the fact.

The operation of the several parts of the machine having been described in detail it is only necessary to set out briefly the general mode of use and operation. The workman on entering Monday morning inserts a new card, pushing it down into the machine as far as it will go, pulls the handle forward and allows it to swing back and then takes out the card. This operation will print and punch an arbitrary number in the lowest line. On leaving work in the afternoon the workman repeats the operation. The card will go deeper into the machine to the extent of one line because of the new shoulder cut thereon at the first operation. The card will select the proper rate mechanism, and will cause a determination of the elapsed time and a multiplication thereof by the selected rate, and the resulting amount will be printed and punched on the second line from the bottom.

On the next day the workman will repeat these operations and the card will show on the third line an arbitrary amount, and on the fourth line the total wages due for the two days. The same operations being repeated for each day of the week, the card will show at the end of the week the total amount due.

Though I have described with great particularity of detail certain specific embodiments of the invention, yet it is not to be understood therefrom that the invention is restricted to the particular embodiments disclosed; various modifications in detail and in the arrangement and combination of the parts may be made by those skilled in the art without departure from the invention.

I do not claim broadly in this application the use of a card with less than nine hole spaces to control the recording of at least nine digital characters; nor the record-controlling member which moves through a distance which varies according to the pin or pins which are actuated. These are claimed broadly in my application No. 601,817, filed January 10, 1911; the claims in the present application being limited to the mechanism shown herein for the purpose as distinguished from the mechanism shown in said application No. 601,817.

What I claim is, in a machine of the class described or of any similar class, the following devices, combinations and subcombinations:—

1. In a machine for making a record on a card, in combination, recording devices at one side of the position of the card, and calculating mechanism controlling said recording devices and arranged at the opposite side of the card, and rate-selecting mechanism arranged above the recording and calculating mechanisms and adapted to control a rate according to which the calculation and the record are made, and escapements for stopping and starting arranged above and controlling the operation of the rate mechanism.

2. The combination with a setting pin adapted to coöperate with a correspondingly located opening in a card, of an operating shaft, and means actuated by said setting pin for releasing said operating shaft.

3. In combination, a setting pin 144 adapted to pass through a correspondingly located opening in a card, a main shaft 152, a hook 183 normally preventing the operation of said main shaft, and intermediate connections between the setting pin and the hook for withdrawing the latter when the setting pin is operated.

4. In combination, a setting pin 144, a rod 226 normally preventing its forward movement, and means actuated by the introduction of a card into the machine for releasing and permitting the forward movement of the setting pin.

5. The combination with a setting pin 144, of a pin 226 lying in front of a shoulder carried by said setting pin and adapted to yield to permit the forward movement of said setting pin and means for forcing and holding back said pin 226 to hold the setting pin back.

6. The combination with a setting pin 144, of operating mechanism for moving it lengthwise, said pin being adjustable also in a direction transverse to its length so as to be fixed in different predetermined transverse positions.

7. The combination with a setting pin 144, adapted to coöperate with an opening in a card, of a link 140 engaged at one end by said pin so as to permit vertical movement of said pin, a pivoted plate 137 connected to the other end of said link, and a spring 138 tending to swing said plate in a direction to thrust said link forward.

8. In combination, a card, a setting pin adapted to pass through an opening in said card, said pin being actuated by the introduction of said card, recording mechanism actuated by the operation of a hand lever, and a locking device for said recording mechanism which is unlocked by the actuation of said setting pin.

9. In combination, a card and a setting pin adapted to pass through said card and to move therewith to a greater or less extent into the machine and setting mechanism connected to said setting pin.

10. In combination, a card, a plurality of rate mechanisms, and means automatically controlled by said card for selecting one of said mechanisms.

11. In combination, a plurality of rate mechanisms for multiplying the movement of the time shaft according to any desired ratio to calculate wages in money, and a mechanism adapted to be connected to one of said rate mechanisms for calculating the passage of hours and minutes from said time shaft, and means for recording at will either said calculated money or said calculated hours and minutes.

12. Means for marking a record upon a card, and mechanism automatically controlled by said card for actuating said means according to any desired one of a plurality of rates.

13. Mechanism for controlling a record, in combination with rate mechanism including a pinion 111 for engaging the mechanism which controls the record, a shaft 123 having an arm linked to said pinion, an arm 129 on the outer end of said shaft, and a hook engaging said arm and normally holding said pinion out of engagement.

14. Mechanism for controlling a record, in combination with rate mechanism including a pinion 111 for engaging the mechanism which controls the record, a shaft 123 having an arm linked to said pinion, an arm 129 on the outer end of said shaft, a hook engaging said arm and normally holding said pinion out of engagement, and a rod 134 connected with said hook so as to release the arm 129.

15. Mechanism for controlling a record, in combination with rate mechanism including a pinion 111 for engaging the mechanism which controls the record, a shaft 123 having an arm linked to said pinion, an arm 129 on the outer end of said shaft, a hook engaging said arm and normally holding said pinion out of engagement, and a slotted bar 131 engaging a pin on said arm 129 to hold said pinion out of said engagement.

16. In combination, rate mechanisms, a bar 131 for releasing the rate mechanisms, a rod 156 adapted to engage said bar to lift it and release the rate mechanisms, means for locking the rate mechanisms from further advance, a shaft 152 for said locking means, and means actuated upon the operation of said shaft for lifting said rod 156.

17. Mechanism for controlling a record, in combination with rate mechanism including a pinion 111 for engaging the mechanism which controls the record, means for throwing said pinion into or out of engagement with said mechanism, said means for operating the pinion including a shaft 123 for withdrawing it from engagement with said mechanism, and a spring 123ª for moving it into such engagement.

18. Mechanism for controlling a record, in combination with rate mechanism including a pinion adapted to be rotated forwardly while out of operative connection with said controlling mechanism, and means for preventing backward movement of said pinion beyond the zero point while in operative connection with the controlling mechanism so that by the backward movement of said pinion in engagement with the mechanism for controlling the record said mechanism moves through a distance equal to the advance of the pinion beyond zero.

19. A rate mechanism including in combination a pinion 111, a stop 118 rotating therewith, a fixed stop 119, a rack 95, means for rotating said pinion 111 while out of engagement with said rack, means for shifting said pinion and rotating stop to bring the pinion into engagement with the rack and to bring the path of said rotating stop into engagement with said fixed stop, and means for longitudinally shifting said rack to rotate the pinion in the backward direction until the rotating stop strikes the fixed stop.

20. Mechanism for controlling a record, in combination with rate mechanism including a driving shaft 97, a driven shaft 98, a third shaft 112, a set of pinions 111 rotating on said third shaft, a set of pinions 110 rotated on said driven shaft and engaging respectively the pinions 111, means communicating the motion of the driven shaft 98 to the first of said pinions 110, and means for communicating to all except the first of said pinions 110 the tenth step of the previous pinion 111.

21. In combination, a rate mechanism adapted to be thrown into and out of use, a rate pin adapted to pass through an aperture in a card, and a spring arranged to force said rate pin forward, said pin being adapted to throw said rate mechanism into operation when in line with an aperture in a card through which it can pass.

22. In combination, rate mechanism, a rate pin controlling said mechanism, an operating shaft, locking means for said shaft, and means actuated by the operation of said rate pin for releasing said shaft.

23. In combination, rate mechanism, a rate pin 141 controlling said mechanism, a link 140 connected to said rate pin, a pivoted plate 137 connected to said link, and a spring for swinging said plate to throw said link and pin forward.

24. In combination, rate mechanism, a rate pin 141, a link 140 connected at one end to said rate pin to permit vertical movement thereof, a pivoted plate 137 connected to the other end of said link, a spring for swinging said plate to throw said link and pin forward, said plate having a slot 136, and a rod 134 for actuating the rate mechanism and having a pin entering the upper end of said slot, whereby upon the downward movement of said plate 137 the rate mechanism is actuated, and upon the downward movement of the rate pin and the forward end of the link 140 the plate 137 may swing upward without lifting the rod 134.

25. In combination, rate mechanism, a rate pin 141 controlling said mechanism, and means for causing it to enter an opening in the card when the latter is introduced into the machine.

26. A pocket, means for making a record upon a card in said pocket, a portion at least of said pocket being movable with the card so as to permit its introduction to varying distances into the machine, and means for automatically determining the extent of its introduction after each operation.

27. A pocket at least a portion of which is movable with the card, and means controlled by the card for first fastening the card in engagement with said pocket and then moving the pocket to the desired extent, so that each card determines the extent of its own movement.

28. A movable pocket, a controlling link 205, a pin 229 carried by said pocket and normally engaged by a shoulder on said controlling link to hold the pocket up, and means for withdrawing said controlling link out of the path of said pin to permit the pocket to fall.

29. In combination, a movable pocket, a controlling link 205, a lever 225, a pin 226 carried thereby, a pin adapted to pass through holes in the card and normally withheld by said pin 226, a pin 228 also carried by said lever 225 and normally supported upon a shoulder of the controlling link 205, and means actuated by the desired pressure of the card in the pocket for releasing said pin 228 from the shoulder of the controlling link, and allowing the pin 226 to move forward so that the perforation in the card shall be engaged and the card fastened to the pocket.

30. A movable pocket, a controlling link 205 normally holding up said pocket, a lever 216 carried by said pocket and adapted to engage said controlling link and shift it to a position in which it is inoperative to hold up the pocket, and means for actuating said lever 216 upon the first downward movement of the pocket.

31. A movable pocket, a controlling link 205 normally holding up said pocket, a lever 216 carried by said pocket and adapted to engage said controlling link and shift it to a position in which it is inoperative to hold up the pocket, a cam 222 for actuating said lever upon the first downward movement of the pocket to withdraw said controlling link, said cam 222 being adapted to yield to permit the restoration of the lever 216 to its original position upon the upward movement of the pocket, and a hook 223 adapted on the upward movement of the pocket to engage and hold the cam 222 after it has yielded to permit the passage of the upper end of the lever 216.

32. A movable pocket, in combination with a controlling member therefor, and means for shifting said member laterally to permit said pocket to fall, and means for thereafter shifting said member downwardly, forwardly, and upwardly to bring said pocket up to its original position.

33. In combination, a movable pocket, a controlling link 205 therefor, a pin 206 over which the end of said controlling link is slotted, a link 207 connected to said pin 206, a pin 208 at the opposite end of said link, a lever 209 fulcrumed upon the pin 208 and connected to said controlling link, and a main shaft 152 having an arm linked to said lever 209, so that upon the turning of said shaft the controlling link 205 is first shifted along the pin 206 and then turned along the latter.

34. In combination, a movable pocket, a controlling link 205 therefor, a pin 206 over which the end of said controlling link is slotted, a link 207 connected to said pin 206, a pin 208 at the opposite end of said link, a lever 209 fulcrumed upon the pin 208 and connected to said controlling link, a main shaft 152 having an arm linked to said lever 209, so that upon the turning of said shaft the controlling link 205 is first shifted along the pin 206 and then turned along the latter, and a spring 214 tending to shift said link 205 forward.

35. In combination, a movable pocket, a controlling link 205 therefor, a pin 206 over which the end of said controlling link is slotted, a link 207 connected to said pin 206, a pin 208 at the opposite end of said link, a lever 209 fulcrumed upon the pin 208 and connected to said controlling link, a main shaft 152 having an arm linked to said lever 209, so that upon the turning of said shaft the controlling link 205 is first shifted along the pin 206 and then turned along the latter, and a spring 239 tending to lift said controlling link, the connection of the main shaft with the lever 209 being slotted so as to effect a positive pull downward and to permit a yielding pull by the spring 239 upwardly.

36. In combination, a movable pocket, a controlling member therefor, and means for moving said member down and locking it there, said pocket being movable independently of said controlling member when said controlling member is in locked position.

37. In combination, a time shaft 96, a clutch member rotating therewith, a nonrotative clutch member, mechanism for making a record, a shaft 152 for operating said mechanism, and means actuated by the rotation of said shaft for bringing said nonrotative clutch member into engagement with the clutch member rotating with said time shaft.

38. In combination, racks 95, means for effecting an engagement of said racks with controlling pinions each adapted to prevent the movement of its rack beyond a certain point, said racks being slotted, a rod 202 passing through the several slots and connected by springs to the several racks, an operating shaft having an arm linked to said rod 202 to pull the same and distort said springs so as to cause each of said racks to advance as far as permitted, and means for utilizing the final positions of said rack bars in determining a record to be made.

39. In combination, racks 95, means for effecting an engagement of said racks with controlling pinions each adapted to prevent the movement of its rack beyond a certain point, said racks being slotted, a rod 202 passing through the several slots and connected by springs to the several racks, an operating shaft having an arm linked to said rod 202 to pull the same and distort said springs so as to cause each of said racks to advance as far as permitted, means for utilizing the final positions of said rack bars in determining a record to be made, segments 58, and segments 94 fixed to the segments 58 and engaged by said racks.

40. In combination, a controlling pin 59, a movable member 57 the length of whose movement determines a record to be made, and a member 66 adapted when moved forward to carry the member 57 with it, the forward movement of the member 66 being controlled by the pin, means for moving said member 66 forward, means for normally retaining said member 66 against movement and means for releasing said retaining means.

41. In combination, a controlling pin 59, a movable member 57 the length of whose movement determines a record to be made, and a member 66 adapted when moved forward to carry the member 57 with it, a spring 69 tending to advance said member 66, and means for preventing such advance movement normally.

42. In combination, a plurality of pins 59, a plate 76 having shoulders at two elevations and in line with different controlling pins, the amount of movement of said plate 76 being determined by the withdrawal of a pin or combinations of pins from its path.

43. In combination, a plurality of controlling pins, a plurality of plates 76, 77, 78, each having shoulders at different distances from its end, said shoulders adapted to strike said pins when the latter are in their normal position, whereby the withdrawal of one or a combination of said pins permits a determined movement of one or another of said plates.

44. In combination, a plurality of controlling pins, a plurality of plates 76, 77, 78, each having shoulders at different distances from its end, said shoulders adapted to strike said pins when the latter are in their normal position, whereby the withdrawal of one or a combination of said pins permits a determined movement of one or another of said plates, and a member 57 engaged by and moved with the most advanced one of said plates 76, 77 and 78.

45. In combination, a plurality of controlling pins, a plurality of plates 76, 77, 78, each having shoulders at different distances from its end, said shoulders adapted to strike said pins when the latter are in their normal position, whereby the withdrawal of one or a combination of said pins permits a determined movement of one or another of said plates, springs tending to advance each of said plates, and means for normally withholding said plates from advancing.

46. In combination, a member 57 the amount of whose movement determines a record to be made, springs tending to advance said member 57, a rod 72 normally held up to prevent said member from advancing, a shaft 56 having arms upon which said rod 72 is carried, an arm 198 near the end of said shaft, an arm 189 having a stop engaging said arm 198 and holding it up in the normal position of the parts, and means for withdrawing the arm 189 from the support of the arm 198 and allowing the shaft 56 to swing.

47. In combination, four controlling pins, three plates having respectively shoulders 90, 86, and 83, at their lower edges and resting upon three separate pins, so that a particular one of said pins is a leader which is necessary to be withdrawn (either alone or in combination with other pins) in order to effect a movement of the corresponding plate, and recording mechanism for recording figures in three groups, each of said plates controlling the recording of one of said groups.

48. In combination, mechanism for making a perforated changing record, and means controlled by said perforations for determining the action of said perforating means in making a succeeding record.

49. In combination, a subtracting mechanism, a recording mechanism including a set of punches, and a plate $a$ for operating said punches, said plate being provided on successive lines with successive combinations of perforations representing from one end to the other in succession two series of figures from 0 to 9, said subtracting mechanism serving to shift said plate $a$ to bring any desired line of perforations in register with the punches, and means for advancing said plate to cause the unperforated portions thereof to engage and actuate the corresponding punches.

50. In combination, a series of plates $a$, punches adapted to be operated by each of said plates, means for shifting said plates to positions for actuating desired combinations of punches, and a shaft $c$ carrying said plates and adapted to be shifted to advance said plates against said punches to operate the selected combinations.

51. In combination, mechanism including a series of different characters and a series of perforating devices adapted to punch a card with different perforations or sets of perforations each corresponding independently to one of said characters and mechanism for separately printing one of said characters upon a card and perforating the card with that one of said perforations or sets of perforations which represents the character printed.

52. In combination, a plate $a$ for actuating punches and adapted to actuate different combinations of punches as it is shifted longitudinally, a plate $j$ carrying on its face types corresponding to the successive parts of the plate $a$, and means for effecting a longitudinal shift of said plates $a$ and $j$ simultaneously.

53. In combination, a series of punch-operating plates $a$, a corresponding series of type-plates $j$, and connections between each of the punch-operating plates and the corresponding type-carrying plate so as to insure the shifting of each pair simultaneously.

54. In combination, calculating mechanism, subtracting mechanism, adapted to modify the operation thereof, printing and perforating mechanisms actuated by said calculating mechanism, and means for operating said subtracting mechanism to modify said calculating mechanism and said printing and perforating mechanism to record the modified indications of said calculating 55. In combination, a succession of links 35, levers 36 for transmitting the movement of said links to a recording mechanism, and intermediate levers 36ª actuated by the downward movement of an adjacent link 35, a lever 36ᶠ released upon the actuation of said lever 36ª, and means whereby the release of the lever 36ᶠ subtracts one from the amount to which the recording mechanism is shifted by the next link 35.

56. In combination, a succession of links 35, levers 36 for transmitting the movement of said links to a recording mechanism, and intermediate levers 36ª actuated by the downward movement of an adjacent link 35, a lever 36ᶠ released upon the actuation of said lever 36ª, a lever 38, 39 pivoted upon the lever 36, a slotted arm 43 connected at one end to said lever 38, 39 and bearing at its opposite end against the lever 36ᶠ, and a pin 41 connecting said lever 38, 39 with the link 35, said lever 36 having a slot 42 through which the pin 41 passes.

57. In combination, a punch-operating shaft $c$, a hammer-operating shaft 17, a main shaft 152 having an arm, and a link 241 attached to said arm and adapted to actuate said shafts $c$ and 17.

58. In combination, a hammer $x$, an arm 16 for effecting the forward movement of said hammer, a hook 20 normally restraining said arm 16, and a hook 24 normally out of line with the adjacent part of said hook 20, means whereby the setting of the appropriate type in position shifts the hook 24 to a position to release the hook 20 from the lever 16, and means for actuating said hook 24.

59. In combination, card printing mechanism, means for preventing the operation of said printing mechanism at successive operations upon said card, a member having a projection and which is movable to successive further advanced points in the making of successive records, and a comb adapted to be pressed forward and to bring its teeth and its spaces successively into engagement with a projection on said movable member, the engagement of the teeth or the spaces determining the action or nonaction of said means for preventing the operation of the printing mechanism.

60. In combination, a pair of simultaneously operable recording mechanisms including a type-hammer adapted to operate upon a card, and means for alternately permitting and suppressing the operation of said hammer at successive operations upon said card.

61. A machine including in combination mechanism for calculating elapsed time, means for printing such time on a card, perforating devices adapted to punch a card with different perforations or sets of perforations each corresponding independently to a separate figure, mechanism for calculating amounts corresponding to elapsed time at a certain rate of pay and means for actuating said perforating devices to punch on the card the amount thus calculated for the elapsed time printed thereon.

62. A machine including in combination mechanism for calculating elapsed time, means for printing such time on a card, perforating devices adapted to punch a card with different perforations or sets of perforations each corresponding independently to a separate figure, mechanism for calculating amounts corresponding to elapsed time at any one of a plurality of rates of pay at will and means for actuating said perforating devices to punch on the card the amount thus calculated for the elapsed time printed thereon.

63. A machine including in combination mechanism for calculating elapsed time, mechanism for calculating amounts corresponding to elapsed time at any one of a plurality of rates of pay at will and means for recording on a card at one operation both the elapsed time thus calculated and the amounts thereof.

64. In combination, recording mechanism, a bar the movement of which controls the recording mechanism, controlling pins whose movements control the recording mechanism, a lock for said rack bar, and a lock for said controlling pins, said two locks being connected to each other so as to be simultaneously moved to their operative positions or away from their operative positions.

65. In combination, a rack bar lock 174, a lock 170, and a link 171 connecting said locks so that they move together to their operative or to their inoperative positions.

66. In combination, punching mechanism, and means for actuating it to punch a card at two different points at the beginning and end of a recess and means for rendering said punching means inoperable after the recess period.

67. A recording machine including punches for punching out shoulders on a card, means for indicating a recess in the workman's time, and means for rendering said punching mechanism inoperative while said recess-indicating mechanism is operative.

68. In combination, recording mechanism, means for indicating a recess in the workman's time, and means for rendering said recording mechanism inoperative while said recess-indicating mechanism is operative.

69. In combination, a recording mechanism, means for determining the amount to be recorded, a recess-indicating mechanism, and locking means for holding said determining means in their zero position while the recess-indicating mechanism is operative.

70. In combination, a printing mechanism including a hammer, recess-indicating mechanism, and means for rendering the hammer-operating mechanism inoperative while the recess-indicating mechanism is operative.

71. In combination, a "noon bar" 162 adapted to be moved a full interval in one direction to render inoperative all mechanisms except the recess-indicating mechanism, and to render this operative to indicate the beginning of the recess, and adapted to be moved backward approximately half the distance of the first step forward, to set the recess-indicating mechanism to indicate the end of the recess, and adapted to be given a third step backward to its original position, rendering the recess-indicating mechanism inoperative and the other mechanisms operative.

72. In combination, a time shaft 96, and a recess-indicating mechanism normally inoperative, and means for simultaneously rendering said recess-indicating mechanism operative and stopping the rotation of said time shaft.

73. In combination, a "noon bar" 162, and an escapement wheel 268 having three teeth, and so connected to the noon bar as to give it first a long movement forward and then two short movements backward.

74. In combination, a "noon bar" 162, an escapement wheel therefor, a slow-movement hook 266, and a quick-movement anchor 265, both adapted to engage the teeth of said escapement wheel, a slow-movement segment 253 adapted to withdraw and hold withdrawn the hook 266, and a fast-moving segment 255 having projections adapted to operate the anchor 265.

75. In combination, a "noon bar" 162, an escapement wheel therefor, a slow-movement hook 266, and a quick-movement anchor 265, both adapted to engage the teeth of said escapement wheel, a slow-movement segment 253 adapted to withdraw and hold withdrawn the hook 266, a fast-moving segment 255 having projections adapted to operate the anchor 265, said projections comprising the ends of arms fastened to said segment 255, and means for fastening said arms at various angular positions to vary the time of operation of the noon bar.

76. In combination, an escapement comprising a slow-moving and a quick-moving operating member, an escapement hook and an escapement anchor operated respectively by said slow-moving and quick-moving members, and an escapement wheel engaged by said hook and anchor so as to be released upon the simultaneous operation of both, and means controlled by said escapement for stopping the movement of a record-making shaft and for restarting said movement automatically.

77. In combination, an escapement comprising a slow-moving and a quick-moving operating member, an escapement hook and an escapement anchor operated respectively by said slow-moving and quick-moving members, and an escapement wheel engaged by said hook and anchor so as to be released upon the simultaneous operation of both, and means controlled by said escapement for stopping the movement of a record-making shaft and for restarting said movement automatically, said quick-moving member having adjustable parts so as to adjust the times of actuation of the escapement anchor.

78. In combination, time-recording mechanism including a shaft whose rotation controls the amount recorded, and means for increasing the rate of rotation of said shaft to take account of over-time work.

79. In combination, time-recording mechanism, and means for increasing the speed of the time-shaft automatically at a determined point.

80. In combination, time-recording mechanism, and means for increasing the speed of the time-shaft automatically at a determined point and returning it to its normal speed at another point.

81. In combination, a time-shaft 96, an actuating shaft 281 therefor, an over-time shaft 315 geared with said shaft 281 and adapted when operative to drive the time-shaft 96 at an increased rate of speed, and clutches for connecting the time-shaft 96 alternately with the actuating shaft 281 and the over-time shaft 315.

82. In combination, a time-shaft 96, an actuating shaft 281 therefor, an over-time shaft 315 geared with said shaft 281 and adapted when operative to drive the time-shaft 96 at an increased rate of speed, clutches for connecting the time-shaft 96 alternately with the actuating shaft 281 and the over-time shaft 315, and means for throwing the shafts 281 and 315 out of engagement with each other so as to prevent the operation of the over-time mechanism.

83. In an elapsed time recording machine the combination of elapsed time printing mechanism, a punching device, and a common differential operating means adapted to be moved one way by the first operation of the machine and to be moved the other way by the second operation of the machine and to represent by its resultant condition the elapsed time between the two operations, and connected with and adapted to move the elapsed time printing mechanism and the punching device to cause them to represent the elapsed time between the said two operations.

84. In an elapsed time recording machine the combination of elapsed time printing mechanism, a punching device, a clock-controlled timing cam, and connections between the cam and the elapsed time printing mechanism and the punching device adapted to move them to correspond with the condition of the timing cam.

85. In an elapsed time recording machine the combination of elapsed time printing mechanism, a punching device, a timing cam, clock-controlled driving means for said cam adapted to be connected with it during pre-determined periods of time and to be disconnected from it at other periods, and connections between the cam and the printing mechanism and the punching device adapted to move them to correspond with the condition of the timing cam.

86. In an elapsed time recording machine the combination of elapsed time printing mechanism, a punching device, a timing cam, clock-controlled driving means for said cam adapted to be connected with it during pre-determined periods of time and to be disconnected from it at other periods, a differential, connections between it and the timing cam adapted to move the differential one way to represent the condition of the timing cam at any operation of the machine, and means for moving the differential the other way in accordance with an earlier operation of the machine, and connections between the differential and the elapsed time printing mechanism and the punching device, whereby the printing mechanism and the punching device will be moved to correspond with the resultant position of the differential device to print and punch the elapsed time between the said two operations of the machine.

87. In an elapsed time indicating machine the combination of a differential adapted to be moved one way in accordance with the time of operation and to be moved the other way in accordance with the time of a prior operation, and a punching device connected with and moved by the differential and adapted to punch holes in accordance with its condition at the time of an operation of the machine.

88. In a time recorder adapted for use with removable cards and provided with a card slot or receptacle, a yielding positioning device adapted to coact with a card, when placed in such a card slot or receptacle, so that when operated it will cause the card to register accurately in place.

89. In a time recorder the combination of a removable card provided with a positioning hole, and a positioning device adapted to enter such hole when the card is inserted in the recorder and to move the card into accurate register in the recorder.

90. In a time recorder the combination of a removable card provided with a positioning hole, and a yielding positioning device adapted to enter such hole to move the card into accurate register in the recorder without injury to the card.

91. In a time recorder the combination of a removable card provided with a rounded positioning hole, and a positioning device similarly rounded or curved so as to be adapted to enter such hole to coact therewith so as to move the card into accurate register with the recorder.

92. In a time recorder the combination of a removable card provided with a relatively large positioning hole, and a positioning device smaller than the positioning hole adapted to enter such hole to move the card into accurate register.

93. In a time recorder the combination of a removable card provided with a positioning hole adapted, when the card is placed in position in the recorder, to be located near to the device in the recorder with which it is desired to accurately register a part of the card, and a positioning device adapted to enter such hole to accurately register the card in the recorder.

94. In a time recorder the combination of a removable card provided with a previously punched hole representing the time of a prior operation and adapted to coact with a device in the recorder to affect a subsequent time recording operation of the recorder and provided with a positioning hole located on the card near said previously punched hole, and a yielding positioning device adapted to enter the said positioning hole and move the card so as to cause the previously punched hole to be in accurate register with the device in the recorder with which it is to coact.

95. In a time recorder the combination with a removable card provided with a plurality of positioning holes, and a plurality of positioning devices adapted to enter such holes when the card is inserted in the recorder, and to move the card into accurate register in the recorder.

96. In a recorder adapted for use with removable cards and provided with a card slot or receptacle, a positioning device adapted to cause a card, when placed in such a card slot or receptacle, to register accurately in place.

97. In a recorder the combination with a removable card provided with a previously punched hole representing the data of a prior operation and adapted to coact with a device in the recorder to affect a subsequent operation of the recorder, and provided with a positioning hole located on the card near said previously punched hole, and a positioning device adapted to enter the positioning hole, to move the card so as to cause the previously punched hole to be in accurate register with the device in the recorder with which it is to coact.

98. In a recorder the combination with a removable card provided with a plurality of positioning holes, and a plurality of positioning devices adapted to enter such holes when the card is inserted in the recorder, and to move the card into accurate register in the recorder.

In witness whereof, I have hereunto signed my name in the presence of two subscribing witnesses.

JOHN ROYDEN PEIRCE.

Witnesses:
    DOMINGO A. USINA,
    THEODORE T. SNELL.